US012483711B2

United States Patent
He et al.

(10) Patent No.: US 12,483,711 B2
(45) Date of Patent: Nov. 25, 2025

(54) METHOD AND SYSTEM OF VIDEO CODING WITH FAST LOW-LATENCY BITSTREAM SIZE CONTROL

(71) Applicant: Intel Corporation, Santa Clara, CA (US)

(72) Inventors: Fan He, Shanghai (CN); Yunbiao Lin, Shanghai (CN); Changliang Wang, Bellevue, WA (US); Yue Heng, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/563,330

(22) PCT Filed: Nov. 17, 2021

(86) PCT No.: PCT/CN2021/131219
§ 371 (c)(1),
(2) Date: Nov. 21, 2023

(87) PCT Pub. No.: WO2023/087177
PCT Pub. Date: May 25, 2023

(65) Prior Publication Data
US 2024/0251089 A1   Jul. 25, 2024

(51) Int. Cl.
*H04N 19/164* (2014.01)
*G06N 3/092* (2023.01)
*H04N 19/172* (2014.01)
*H04N 19/196* (2014.01)
*H04N 19/42* (2014.01)
*H04N 19/80* (2014.01)

(52) U.S. Cl.
CPC .......... *H04N 19/164* (2014.11); *G06N 3/092* (2023.01); *H04N 19/172* (2014.11); *H04N 19/197* (2014.11); *H04N 19/42* (2014.11); *H04N 19/80* (2014.11)

(58) Field of Classification Search
None
See application file for complete search history.

(56) References Cited

U.S. PATENT DOCUMENTS

| | | | |
|---|---|---|---|
| 2020/0014963 A1* | 1/2020 | Gogoi | H04N 21/6583 |
| 2021/0289215 A1 | 9/2021 | Helmrich et al. | |
| 2023/0048189 A1* | 2/2023 | Boddeti | H04W 12/37 |
| 2024/0056576 A1* | 2/2024 | Besenbruch | G06N 3/045 |

FOREIGN PATENT DOCUMENTS

CN    105338422    2/2016

OTHER PUBLICATIONS

International Search Report and Written Opinion for PCT Application No. PCT/CN2021/131219, dated Aug. 16, 2022.
Kazui, K., "AHG14: Revised software for ultra low-latency encoding", Joint Video Experts Team (JVET) of ITU-T SG 16 WP3 and ISO/IEC JTC1/SC29/WG11, document: JVET-N0080, 14th Meeting: Geneva, CH Mar. 19-27, 2019.

* cited by examiner

*Primary Examiner* — Samuel D Fereja
(74) *Attorney, Agent, or Firm* — Akona IP PC

(57) ABSTRACT

Techniques related to video coding with fast low-latency bitstream size control includes detecting outliers and determining a target bitstream size based on the outlier and reinforcement-learning.

20 Claims, 15 Drawing Sheets

DETERMINE A RELATIONSHIP FUNCTION BETWEEN OBTAINED LATENCY AND BITSTREAM SIZE FEEDBACK ASSOCIATED WITH TRANSMITTED ENCODED VIDEO DATA 202

↓

DETERMINE ONE OR MORE OUTLIERS OF THE RELATIONSHIP FUNCTION 204

↓

SET A TARGET BITSTREAM SIZE AT LEAST PARTLY DEPENDING ON THE OUTLIER 206

↓

PROVIDE A VERSION OF THE TARGET BITSTREAM SIZE TO BE USED TO SET AT LEAST ONE ENCODER SETTING TO ENCODE A VIDEO FRAME 208

OBTAIN LATENCY AND BITSTREAM SIZE FEEDBACK ASSOCIATED WITH TRANSMITTED ENCODED VIDEO FRAMES 252

↓

GENERATE AN INITIAL TARGET BITSTREAM SIZE USING THE FEEDBACK 254

↓

GENERATE AN OUTPUT TARGET BITSTREAM SIZE BY ADJUSTING THE INITIAL TARGET BITSTREAM SIZE USING REINFORCEMENT LEARNING 256

↓

PROVIDE THE OUTPUT TARGET BITSTREAM SIZE TO SET AN ENCODER SETTING TO ENCODE A VIDEO FRAME 258

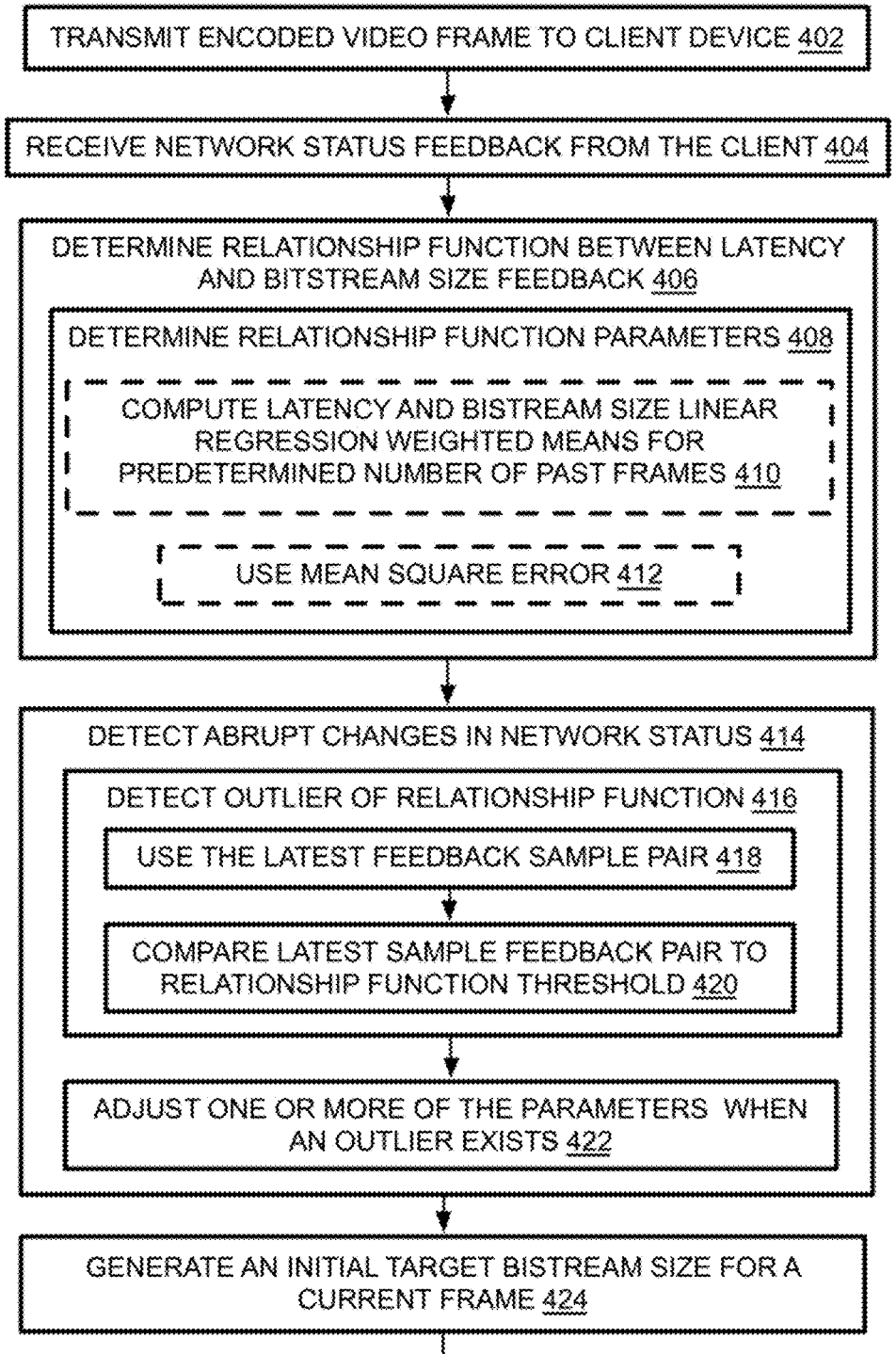

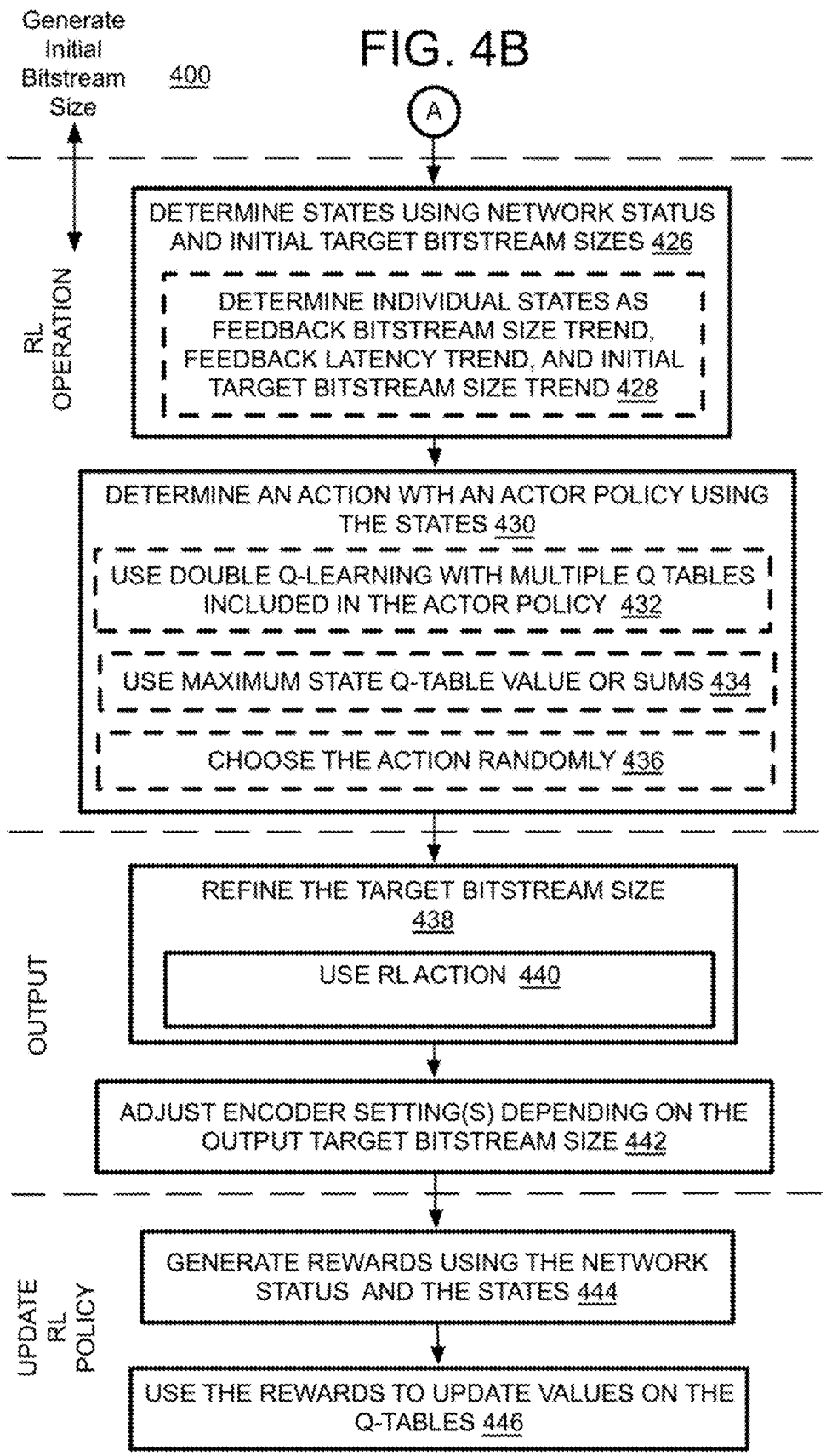

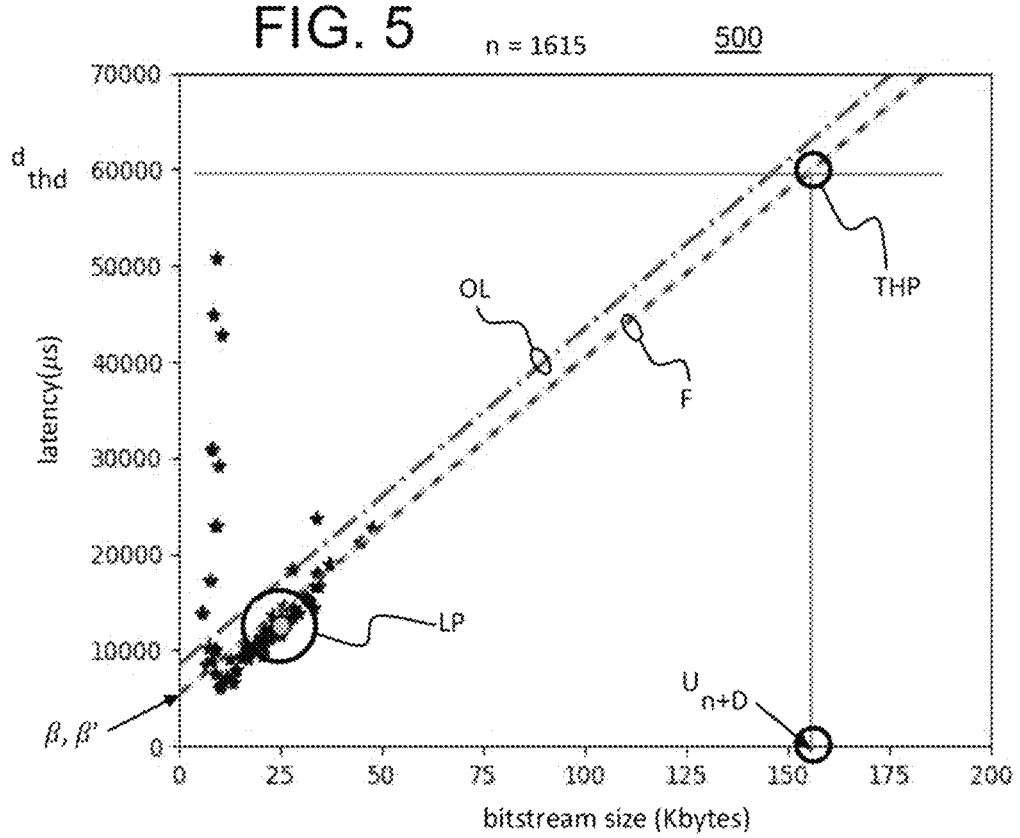
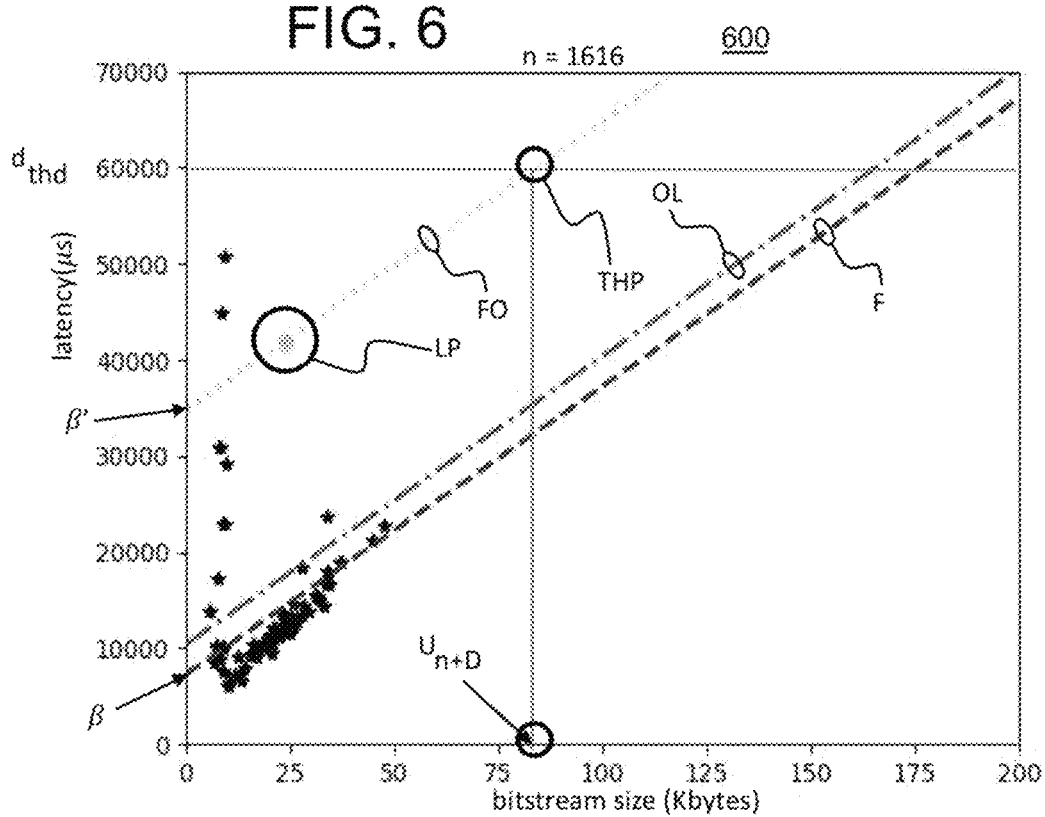

814

| State | Action | | |
|---|---|---|---|
| | Low | Med. | High |
| 0 | 100 | 40 | 50 |
| ⋮ | ⋮ | ⋮ | ⋮ |
| 25 | 60 | 45 | 75 |
| 26 | 55 | 30 | 45 |

METHOD AND SYSTEM OF VIDEO CODING WITH FAST LOW-LATENCY BITSTREAM SIZE CONTROL

CLAIM OF PRIORITY

This Application is a National Stage Entry of, and claims priority to, PCT Application No. PCT/CN2021/131219, filed on Nov. 17, 2021 and titled "METHOD AND SYSTEM OF VIDEO CODING WITH FAST LOW-LATENCY BITSTREAM SIZE CONTROL," which is incorporated by reference in its entirety for all purposes.

BACKGROUND

In video compression (codec) systems operated over world wide networks such as the internet, it is well known that the network status, such as the network bandwidth, can fluctuate for many different reasons such as wireless transmission obstacles including terrain or structures such as buildings or walls within the buildings, the receiving device is moving on a vehicle, network overcrowding, and so forth. When the bandwidth drops, this can create a greater packet loss rate and greater end to end (E2E) latency causing periods of transmission interruption or pauses in streaming video on a receiving device, severely impacting a user experience. This is particularly troublesome with online gaming that uses very high frame rates so that latencies with relatively long durations may delay a much larger number of frames compared to video communication. It is also a large annoyance when a cloud game uses interactive scenarios when a user is more sensitive to latency. Typical solutions that control bitrate for the video communication applications, for example, do not reduce latency in sufficient time for high frame rate applications or when network status varies to prevent poor streaming experiences for a user.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 2A is a flow chart of an example method of video coding with fast low-latency bitstream size control according to at least one of the implementations herein;

FIG. 2B is a flow chart of another example method of video coding with fast low-latency bitstream size control according to at least one of the implementations herein;

FIGS. 4A-4B is a flow chart of an example detailed method of video coding with fast low-latency bitstream size control according to at least one of the implementations herein;

FIG. 5 is a graph showing latency per bitstream size used to set the bitstream size according to at least one of the implementations herein;

FIG. 6 is another graph showing latency per bitstream size used to set the bitstream size according to at least one of the implementations herein;

DETAILED DESCRIPTION

Figure 1:
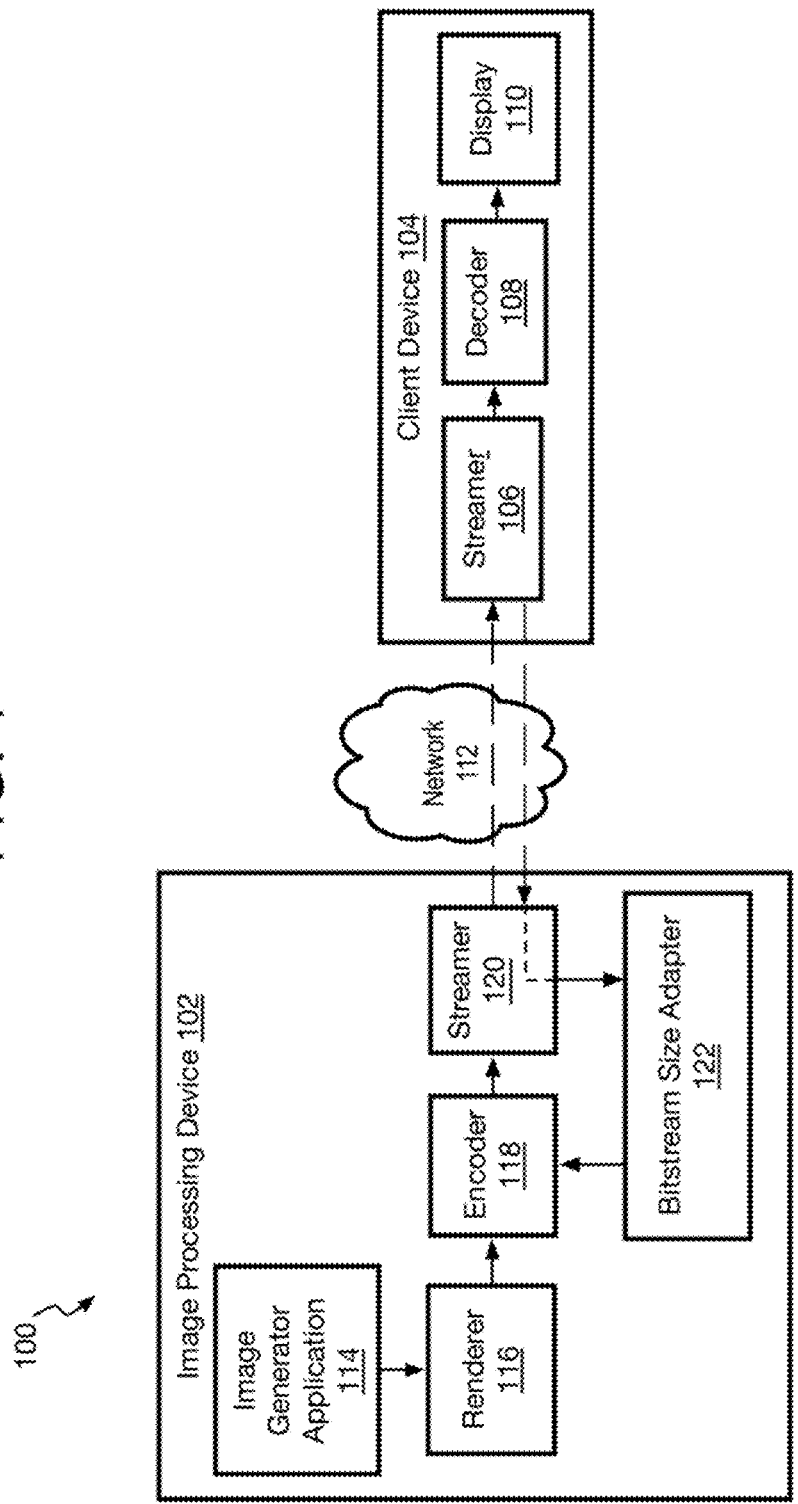
FIG. 1 is a schematic diagram of an image processing system according to at least one of the implementations herein.

One or more implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein also may be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various commercial or consumer computing devices and/or electronic devices such as internet or cloud servers, gaming engines, game consoles, set top boxes, smart phones, tablets, laptops, televisions, computers, mobile gaming devices, virtual, augmented, or modified reality headsets, and so forth, may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as DRAM and so forth.

References in the specification to "one implementation", "an implementation", "an example implementation", etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described herein.

Methods, devices, apparatuses, systems, computing platforms, and articles described herein are related to video coding with fast low-latency bitstream size control.

In cloud gaming, a server renders frames of game content according to a game application usually running locally on the server. The rendered frames are formed into a video sequence, compressed, and packed into a bitstream by a video encoder operating codec such as HEVC, AVC, and so forth. The compressed video sequence is then streamed to a player's client device through a network such as the internet. The client device may be a smartphone or game console for example, and that extracts the compressed video frame data from the bitstream, decodes the frames, and displays the video sequence on a display.

Two key metrics that affect the user experience are the visual quality of the images and latency. Latency here refers to one-way or end-to-end (E2E) latency that typically refers to the duration from a time a frame is compressed and ready to be transmitted from the server and to a compressed frame buffer (or jitter buffer) at the client where frames, or packets, await to be decompressed. The greater the visual quality, the more bits per frame (or higher bitrate) that is being used which causes greater latency. When too much latency occurs, the user experiences pauses or interruptions in the video playback. Thus, the two metrics must be balanced to provide a good user experience. The balancing can be accomplished by controlling the target bitstream size. Bitstream size is an instantaneous actual or target sample of the bitstream size in bytes, for example, and may be provided for encoding units such as per frame. In contrast, bitrate is measured over time where bitrate (bps) is bitstream size (converted to bits) multiplied by the frame rate (fps). Thus, the bitrate can be at least partially controlled by controlling the bitstream size.

The conventional coding systems typically set a maximum bitrate that provides an E2E latency that is always below a threshold. The threshold better ensures an acceptable viewing experience to end users. Particularly, when the bandwidth of the network varies, the E2E latency can unintentionally vary at different times. For applications with high frame rates such as online games, the latency can increase very significantly very quickly thereby impacting the user experience when the target bitstream size is not adjusted to compensate and reduce the latency. Thus, when the network status drops (i.e., when the bitstream bandwidth is reduced causing greater packet loss rates), some conventional systems reduce the target bitstream size, and in turn the bitrate, to maintain the latency under the threshold. Conventional systems use algorithms such as perQ used in Web Real-Time Communication (WebRTC) or variable bitrate (VBR) control to control the bitstream size.

Once the network status recovers such that the bitstream bandwidth is increased, the target bitstream size should be increased to provide adequate capacity for high visual quality images expected in cloud gaming. The conventional systems, however, react relatively slowly to changes in network status by increasing the bitstream size slowly and without sufficient sensitivity to E2E latency-visual quality balance required for high frame rate applications, typically resulting in latency that reduces the quality of the user viewer experience anyway. Particularly, these known latency reduction solutions for cloud gaming were originally used for video conferencing where frame rates are relatively slower, and high sensitivity to E2E latency-high quality image balance is not a high priority. Thus, the conventional solutions used relatively slow processes such as adjusting a video encoder's bitrate during runtime by analyzing certain network statistics over time, such as packet loss rate, bandwidth, and round-trip-time. These types of statistics usually use sliding window averaging or other computations. For example, packet loss rate usually includes counting how many packets are lost in a certain past duration. Delay is caused by waiting to count the lost packets and waiting to compare an average to a threshold. By then, a very large number of frames may have been delayed causing a latency sufficiently large to be noticed by a user.

In addition, the conventional systems cannot quickly adapt to certain network situations. For example, when a game player is riding in a vehicle, the network status may drop, recover, drop, recover, and keep repeating creating a situation where the bandwidth keeps oscillating, and this oscillating may occur during a relatively short time span measured in minutes. By another example, a player online at their home may be connected to wired WiFi when the network status drops but recovers soon, such as within a number of seconds. In these cases, some conventional solutions work well in one situation but are too aggressive or too cautious in another situation. For example, perQ in webRTC is too cautious. After the system decreases the bitstream size, and in turn the encoding bitrate due to a small spike in latency caused by a short-duration drop in the network status as mentioned, the conventional system takes way too long to recover and set the bitrate at a normal level. This occurs even though the network status has already recovered quickly, well before the bitrate is up to the normal level. This can cause unnecessary low quality frames.

To resolve these issues, the disclosed system and method estimate the current network status by parsing the previous actual bitstream sizes and latencies as feedback from a client device, and predict the maximum allowed target bitstream size of a next frame to better ensure the E2E latency of a next frame will be below an acceptable latency threshold. This method reacts very quickly when network bandwidth (or status) drops to avoid latency accumulation, and controls the speed of bitstream size changes by learning from past results to adapt to different network environments.

By one approach, a relationship function is determined relating the latency feedback to the bitstream size feedback. Outliers relative to the function are then used to generate an initial target bitstream size. Specifically, it has been found that outliers of the function that indicate abrupt changes in network bandwidth (or status) from one frame to the next frame (measured in time (e.g., microseconds)) can be revealed when the relationship function and a threshold used to determine outliers are based on past data of the feedback. Thus, the relationship function and its outlier threshold merely needs to be at least sufficiently precise to reveal frames with a significant increase in latency feedback in a single frame and that does not sufficiently fit the relationship function. Thus, by one example approach, weighted linear regression (WLR) may be used to approximate a linear model that describes the relationship between latency and bitstream size feedback. Parameters of the linear regression model may be based on the feedback. Then for quick reactions to sudden changes in the network bandwidth, outlier detection together with the WLR is used to adjust the parameters of the linear regression model depending on the outliers present for every frame. The adjusted relationship function and a latency threshold are then used to form the initial target bitstream size.

To adapt even better to different network situations, reinforcement learning also may be used to modify or refine the initial target bitstream size. Reinforcement learning can properly balance image quality and latency, and properly and more consistently handle explore-vs-exploit determinations, where explore refers to accepting higher risk for greater reward rather than using the safest known solution, while exploit refers to using prior known solutions. The reinforcement learning approach is much more adaptable than traditional rule-based approaches and supervised deep learning-based approaches. Given a limited number of next actions for each current state of the encoding environment, the values for each next action may be considered, and the best value may be selected for the next action. To accomplish this, the reinforcement learning (RL) system does not use supervised training datasets with ground truth labels, and unlike unsupervised learning that merely recognizes patterns in an input dataset, reinforcement learning goes further and determines, through experience, which are the next best actions based on an environment (or current state).

Specifically, a policy can output a proper action based on states associated with a current environment of the system, bitstream, and frames. As the policy is implemented, correct or desirable actions provided by the policy are reinforced, and over time, the policy evolves to take actions that are more correct or produce greater rewards as indicated by the feedback. The rewards also are used to evolve the policy.

For the present system and method here, reinforcement learning actions are coefficients provided as parameters to an output filter used to adjust or refine the initial target bitstream size in order to control and vary the speed of changes to an output target bitstream size, depending on a number of different situations. This technology provides a desirable balance between E2E latency and visual quality resulting in a much better user experience for cloud or online game players and other video viewers.

Referring to FIG. 1, an image processing system 100 operates methods disclosed herein for bitstream size control and may have an image processing device or system 102 communicating through a computer or communications network 112 to a client device or system (or just client) 104. The image processing device 102 may be, or have, a server or other computer including circuitry to operate applications such as to provide video sequences for online or cloud gaming, but could be providing video for other applications, such as for video conferencing and/or entertainment whether tv, movies, and so forth. The network 112 may be the internet or any other wide area network (WAN) or local area network (LAN) that handles video transmissions. The client 104 may be, or have, any such client device with circuitry that decodes, processes, and displays images, whether at a single physical location or single device or among a number of devices communicating over one or more networks to form the client 104. Thus, the client may be any computing device such as a smartphone, tablet, laptop, desktop, mobile gaming handheld device, or game console, but could also be a base that performs the processing for a remote display such as a virtual reality (VR) display worn by a user, and so forth.

The image processing device 102 may include an image generator application unit 114, a renderer 116, an encoder 118, a streamer 120, and a bitstream size adapter unit 122. The image generator application 114 may be a game or other application that generates image data by deciding the image perspectives and objects to be in the images and so forth, for gaming. This may be accomplished by updating a model for example. For gaming where images still need to be rendered to create an image before the image is ready for encoding, the image data from the image generator application may be provide to the renderer 116. The completed images are then provided to the encoder 118. Otherwise, while the present system and method are mainly used for artificial images that need rendering, the unit 114 could be used for camera video applications, and the unit 114 may be a camera or video pre-processing unit that provides camera images directly to the encoder 118.

The encoder 118 operates according to a codec standard such as MPEG-4 (H.264), HEVC (H.265), AVC, VP #, and so forth. An encoder typically compresses the data by first, adjusting the resolution of the images for compatibility and computational load reduction (or raising the bitrate) as needed. This also may include converting the color scheme (such as from RGB to YUV) as needed, since many codecs operate on YUV image data. The images are then usually divided into blocks and differenced with a prediction of the blocks to generate residuals. The residuals are then transformed into coefficients, such as by discrete cosine transform (DCT), and then compressed first by using lossy quantization and then non-lossy entropy coding. The quantization step sizes are set by a quantization parameter (QP) which is controlled by a bitrate controller of the encoder. Most relevant here, the bitstream size from the bitstream size adapter 122 described herein may be provided to the encoder either to adjust the bitrate according to the bitstream size and other factors, and by adjusting the QP, or to adjust the resolution of the images to be encoded.

As to the bitrate control, the bitrate controller (BRC) of an encoder controls the bitrate during encoding of a video sequence by controlling the quantization of the images being encoded. Specifically, encoding often includes the quantization of image data values to a certain number of predetermined levels or steps to perform a type of lossy compression. The quantization parameter (QP) also referred to as a QP index, is used to determine a quantization step or level size (QP-step) for associating transformed image data coefficients with a finite set of steps. This also is referred to as quantization scale. Large values of QP represent large steps (large values of QP-step) that crudely approximate the spatial transform, so that most of the signal can be captured by only a few coefficients. However, while this results in less bits, more detail of the image is lost. Small QP values (and small QP-step) more accurately approximate an image block's spatial frequency spectrum thereby providing more image detail, but at the cost of more bits. The QPs may be provided on a frame-level or coding block level, such as macroblocks (MBs) or coding tree units (CTUs). The target bitstream size can be used to set any of the QPs.

The compressed residuals also are provided to a decoder loop of the encoder to generate the predictions in a way that imitates a decoder. At the decoder loop, the residuals are decompressed, added to the predictions, and run through quality loop filters to generate full decompressed frames that can be used as reference frames for inter-prediction on the decoder loop. The loop then performs intra-prediction or inter-prediction using the reference frames and to generate the predictions first differenced from the residuals.

The compressed residuals as well as other encoder data is provided to the streamer 120. The streamer 120 has a receiver and transmitter (or transceiver) to pack the compressed data into packets then placed into a bitstream for transmission to one or more clients 104. The bitstream is then transmitted according to a clock at the streamer at, 30 or 60 fps, and by operations and circuitry typical for transmission control protocol (TCP) and/or user datagram protocol (UDP), to name a few examples.

The steamer 120 at the image processing device 102 also may have its receiver receive feedback such as network status including the actual bitstream size and E2E latency detected for a video frame transmitted from the image processing device 102, and detected by a streamer 106 of the client device 104. In this case, the client streamer 106 may compute the latency based on a transmission time stamp of the first received data of a frame and time stamp of completed receipt of the frame, although other alternatives can be used. By one form, the latency or clock synchronization between the streamers 106 and 120 may be controlled and/or measured by using precision time protocol (PTP) from IEEE 1588 as one example. The client streamer 106 also may take an instantaneous sampling of the bitstream size at the receipt of the last data of the frame as well. In this case, the difference of the two times as the E2E latency and bitstream size may be transmitted back from the client streamer 106 to the image processing device streamer 120. By an alternative, the client streamer 106 may transmit the receipt timestamp so that streamer 120 can compute the latency itself. Either streamer 106 or 120 may have a network status module or unit that computes or determines the network status for feedback.

The bitstream size adapter 122 receives the feedback. The bitstream size adapter 122 also may have a predetermined threshold (or maximum) latency that is determined by experimentation. As described herein, the bitstream size adapter 122 uses the feedback to generate an initial target bitstream size for a next frame and that is sensitive to outlier bitstream size and latency feedback samples that can indicate abrupt change in network status. The initial target bitstream size also factors the latency threshold to attempt to maintain a minimally acceptable user experience.

The bitstream size adapter 122 then refines the initial target bitstream size by using reinforcement learning to provide adaptable solutions. The bitstream size adapter 122 generates filter coefficients as actions to be used to refine the initial target bitstream size. An output target bitstream size is then provided to the encoder 118 to adjust the QP or image resolution to encode a next frame as mentioned above. Reinforcement learning rewards also may be based on the feedback ad used to adjust or evolve the policy that provides the actions.

On the client side, the compressed data received at actual bitstream sizes, and in turn bitrates according to the methods herein, may be provided to a decoder 108, which then may display the images on a display 110. Many of the other details of the operation of these units or modules are explained below.

Referring to FIG. 2A, an example process 200 for video coding with fast low-latency bitstream size control is arranged in accordance with at least some implementations of the present disclosure. Process 200 may include one or more operations 202-208 numbered evenly. By way of non-limiting example, process 200 may perform coding with bitstream size control as performed by any device, system, or unit as discussed herein such as system, device, or unit 100, 300, 500, 1600, and/or 1700 of FIGS. 1, 3, 5 16, and/or 17 respectively, and where relevant.

Process 200 may include "determine a relationship function between obtained latency and bitstream size feedback associated with transmitted encoded video data" 202. This refers to any compressed video sequences transmitted over a network such as the internet. By one form, the images or frames may be synthetic computer-created images rendered for online gaming. By one form, a client device may receive the compressed frames over a computer or other network, and determine the E2E latency of the frame, or at least the time stamps to compute the latency, as well as the bitstream size. This feedback data, referred to as feedback samples, points, or pairs, may be transmitted back as feedback to the originating system or device, such as a server, or a streamer or receiving device, module, or unit associated with the originating system.

By one form, the relationship function is a linear regression algorithm or linear model to relate the bitstream size feedback to the latency feedback. The determining of the relationship function refers to determining the parameters of the function, which in this case are at least partly based on the feedback. By one form, the algorithm factors a set of past samples or feedback pairs to determine the parameters. By one form, a minimized and weighted mean square error is used to determine the parameters and is computed by generating separate means of the latency and bitstream size.

Process 200 may include "determine one or more outliers of the relationship function" 204. By the examples describe herein, an outlier threshold may be set by using a weighted mean square error of the latency feedback and bitstream size feedback used by the linear aggression algorithm. In order to maintain a low computational load and better ensure the system has time to adjust to an abrupt change in the network status, the latest or last feedback point (LP) of a sample set of feedback points being held in memory, such as a buffer, is compared to the outlier threshold rather than many points. The LP represents the feedback point of a last frame of a set of available or saved feedback points of a number of past frames. It will be understood that some other representative point could be used instead, or a combination value, such as an average point of some last N points, to name a few examples.

Process 200 may include "set a target bitstream size at least partly depending on the outlier" 206. Here, when the outlier threshold is not met, one or more of the parameters may be set so that the relationship function includes or fits (or graphically intersects) the outlier. Once the modified algorithm is set, a maximum target bitstream size that still meets the latency threshold can be determined in an equation that uses the latency threshold.

Process 200 may include "provide a version of the target bitstream size to be used to set at least one encoder setting to encode a video frame" 208. This operation may refer to either providing the initial target bitstream size to the encoder or to refine the initial target bitstream size by using other processes. One example for refinement to make the bitstream size more adaptable to different situations, the initial target bitstream size may be provided to an output filter. The output filter may receive reinforcement learning actions in the form of filter coefficients. Other details of the reinforcement learning that could be included here are described in process 250.

As to the encoder's use of the target bitstream size, the bitstream size may be provided to an encoder controller such as a bitrate controller in order to adjust the QP or resolution of the images being encoded for example. By one form, this can occur in a single frame or some other frame interval, where the feedback point of a current frame is received and analyzed, and a next frame, which may be a consecutive subsequent frame to the current frame, receives the output bitstream size for encoding of that next frame. This is much faster than known bitstream or bitrate and latency control algorithms.

Referring to FIG. 2B, an example process 250 for video coding with fast low-latency bitstream size control is arranged in accordance with at least some implementations of the present disclosure. Process 250 may include one or more operations 252-258 numbered evenly. By way of non-limiting example, process 250 may perform coding with bitstream size control as performed by any device, system, or unit as discussed herein such as system, device, or unit 100, 300, 500, 1600, and/or 1700 of FIGS. 1, 3, 5 16, and/or 17 respectively, and where relevant.

Process 250 may include "obtain latency and bitstream size feedback associated with transmitted encoded video frames" 252, and as described with operation 202 for process 200.

Process 250 may include "generate an initial target bitstream size using the feedback" 254. This operation also may be performed by the example of the operations of process 200 using an outlier of the relationship function to indicate the maximum initial target bitstream size that should be used. As mentioned, the initial target bitstream size may be provided to an output filter for refinement by reinforcement learning.

Thus, process 250 may include "generate an output target bitstream size by adjusting the initial target bitstream size using reinforcement learning" 256. As mentioned, and by one form, the reinforcement learning may provide filter coefficients as actions from a reinforcement learning actor, where the actions are generated according to a policy operated by the actor. The action may be based on the feedback, the initial target bitstream sizes, or both. Specifically, the feedback is treated as the reinforcement learning environment and is used to generate states that represent the environment. The states may indicate trends in the feedback (the bitstream size feedback and latency feedback) and initial target bitstream size. The rewards used to evolve the policy also may be based on the feedback. By one example form, the policy may be a double Q-learning policy to generate the actions.

The double Q-learning policy involves using two tables, each listing values or Q values used to select the action. The values are arranged or sorted so that each row (or column) corresponds to a different possible state while the opposite column (or row) indicates the available alternative actions for each state. In operation, the state is determined and then looked up on a Q table. The action alternative with the maximum table value for that state is selected as the action. By one form, the values in the two tables for the same state and same action alternative (for example, in column #2 in both tables for a state 10) may be summed, and the largest sum of all of the available sums for the looked-up state is selected to indicate the action to be used to refine the initial target bitstream size. By another form, at least some portion of the frames (such as 5% by one example) has the action chosen randomly among those actions available for a state to better 'explore' with the reinforcement learning where the selection may have higher risk of failure but also a chance of a better reward. The updating of the Q tables by using the rewards also may be performed by updating one of the tables randomly, and this may occur each time a frame (or feedback point) is being received and used for analysis. In this case, the updating of one or a first Q table involves the use of a value in the opposite or second Q table at a corresponding location to the location being updated in the first Q table.

Once the action is used to generate an output bitstream size, process 250 may include "provide the output target bitstream size to set an encoder setting to encode a video frame" 258. Here too, this operation is the same or similar to operation 208 of process 200 described above.

Figure 3:
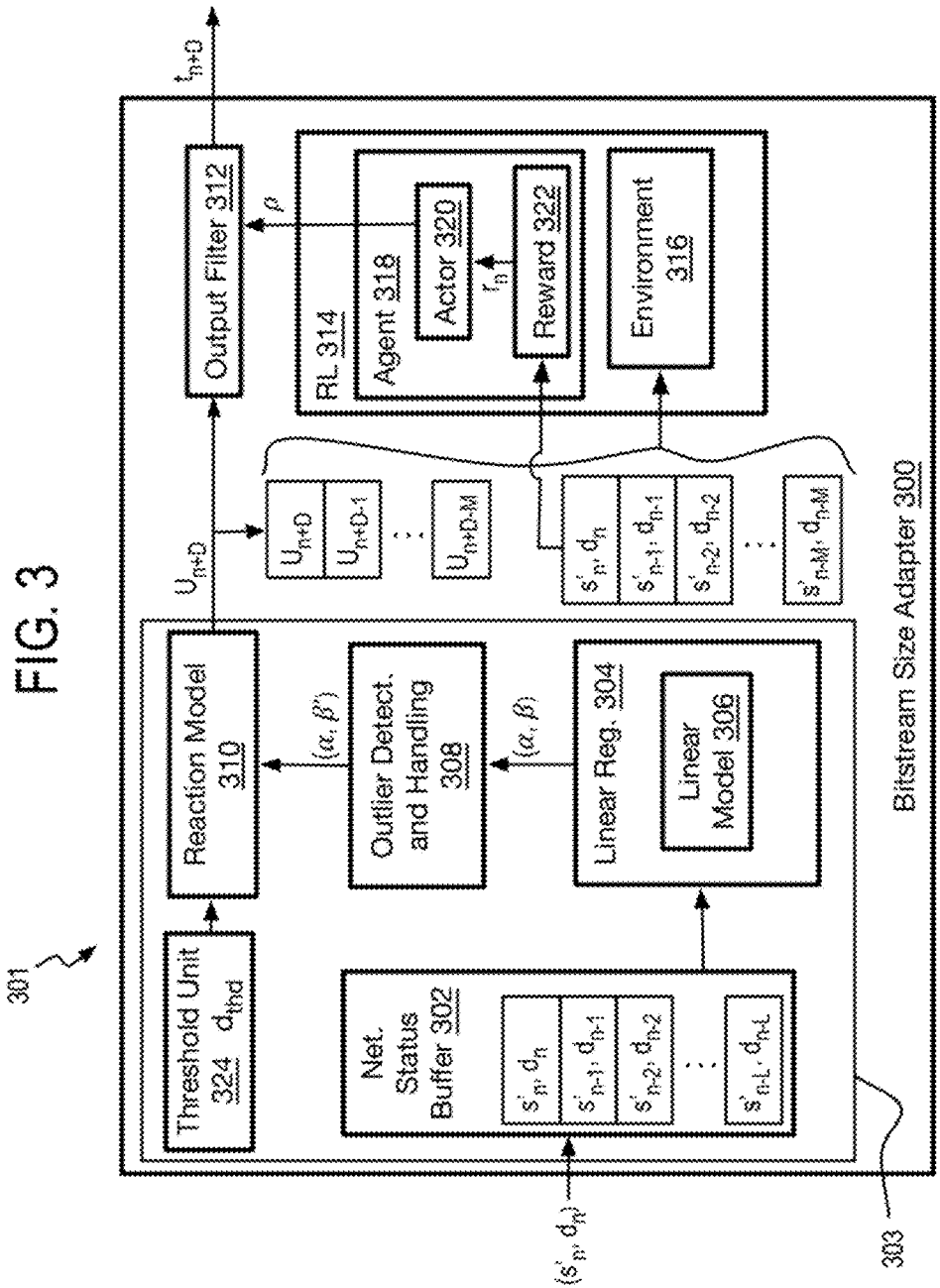
FIG. 3 is a schematic diagram of a bitstream size adapter according to at least one of the implementations herein.

Referring now to FIG. 3, an image processing system 301 to perform the methods herein has a bitstream size adapter 300, similar to the bitstream size adapter 122 (FIG. 1). The bitstream size adapter 300 has an initial target bitstream size unit 303 and a reinforcement learning unit 314. The initial target bitstream size unit 303 may have, or may be communicatively coupled with, a network status buffer 302, a relationship function unit which here is a linear regression unit 304 with a linear model 306, an outlier detection and handling unit 308, a reaction model 310, and a threshold unit 324 that provides a latency threshold $d_{thd}$. The latency threshold may be predetermined by experimentation. In operation, the buffer 302 provides feedback pairs or points ($s'_n$, $d_n$) where $s'_n$ is bitstream size feedback and $d_n$ is latency feedback. The buffer may hold L pairs were L is determined by system capacity, efficiency, and other factors. The linear regression unit 304 uses the feedback pairs in a linear model 306 to computer linear parameters $\alpha$ and $\beta$. The parameters are provided to the outlier detection and handling unit 308 to detect the outliers. If an outlier exists, the linear model is adjusted by the outlier unit 308. The reaction model 310 then generates an initial target bitstream size $U_{n+D}$ by using the latency threshold $d_{thd}$ and the parameters, which may be adjusted parameters ($\alpha$ and $\beta'$) when an outlier exists. D refers to the number of frame intervals between the frame that provided the feedback and the next frame to be encoded (so that D could be more than one) and is explained in greater detail below.

The reinforcement learning unit 314 may receive both the feedback pairs (s'$_n$, d$_n$) and the initial target bitstream sizes U$_{n+D}$, which may be held in memory such as buffers, which may or may not include buffer 302. Here, the number of feedback pairs of latency and bitstream sizes is from 1 to M which is a count of the number of past frames being considered and having feedback pairs being held in a buffer. The count M does not necessarily equal the count L and may be determined by experimentation. The reinforcement learning unit 314 may have an environment unit 316 to generate states using the input data, and an agent or agent unit 318 that has an actor 320 with a policy to generate actions p. A reward unit 322 uses the feedback pairs (s'$_n$, d$_n$) to generate rewards In used to evolve the policy. The bitstream size adapter 300 also has an output filter 312 to refine the initial target bitstream size U$_{n+D}$ using the actions ρ to generate an output target bitstream size t$_{n+D}$. The details of the operation of the bitstream size adapter 300 are provided below with process 400.

Referring to FIGS. 4A-4C, an example process 400 for video coding with fast low-latency bitstream size control is arranged in accordance with at least some implementations of the present disclosure. Process 400 may include one or more operations 402-446 numbered evenly. By way of non-limiting example, process 400 may perform bitstream size control as performed by any device, system, or unit as discussed herein such as system, device, or unit 100, 300, 500, 1600, and/or 1700 of FIGS. 1, 3, 5 16, and/or 17 respectively, and where relevant.

Process 400 may include "transmit encoded video frame to client device" 402, and whether the frames were originally obtained directly from a rendering operation or from memory. By one approach, the frames are artificial and rendered such as computer generated rather than being captured by a camera. As mentioned with system 301, the frames may be compressed by an encoder and then transmitted from a transmitter (or streamer) at a server, and then received over a network at a receiver (or streamer) at a client device.

Process 400 may include "receive network status feedback from the client" 404. By one form, a video sequence streaming may have 1 to N frames where a particular frame n may be transmitted. After receiving the bitstream of frame n at a client device, the streamer at the client device may have or be associated with a status unit that determines the feedback data. The client streamer transmits the network status back to the source, or here to a server or image processing device 300, as feedback for example. The network status may include or represent actual or real bitstream size s'$_n$ and the transportation or E2E latency d$_n$ of the frame n. The feedback pair or point (s'$_n$, d$_n$) is transmitted back to the streamer at the server. It should be noted that sometimes s'$_n$ does not exactly equal the real bitstream size s$_n$ due to statistical timing or bitstream size measuring tolerances, or lost feedback data, but should be close enough to provide accurate results here. Due to the round trip time from transmission of frame n to the time the bitstream size adapter unit 300 receives the feedback s'$_n$ and d$_n$, the server is now preparing to encode frame n+D relative to transmission of frame n. The variable D is round trip delay in frame count. For example, when the server receives the feedback from the client device for the 10th frame, the server cold be preparing to encode the 14th frame. In this case, variable D is 4. Of course, D could be 1 if the receipt of the feedback happens very quickly such that a next consecutive frame could be ready for encoding when feedback of a frame n is received at the server. Variable D can vary due to network status changes such as bandwidth, and so forth.

By one approach, the feedback pairs are placed in a network status buffer, such as buffer 302 (FIG. 3), to hold t=0 to L feedback pairs. By one example, 100 pairs may be held. The buffer capacity may be limited by the computational load and delay to limit memory transactions as well to limit the number of pairs that can be handled at once to maintain a desired level of efficiency even though more pairs to be included in means (averaging) computations could increase image quality by indicating the relationship between size and latency more precisely.

Process 400 may include "determine relationship function between latency and bitstream size feedback" 406. Here, a number of different algorithms can be used to set the relationship between actual bitstream size and actual latency as represented by the feedback. In order to reduce the computational load, however, weighted linear regression (WLR) may be performed here as the relationship function, and which may be operated by linear regression (or relationship function) unit 304 (FIG. 3). The relationship between actual latency and actual bitstream size can be approximated by a linear model (306):

$$\text{latency} = \text{bitstream\_size}/\text{bandwidth} + \text{other\_latencies} \quad (1)$$

The "bitstream size/bandwidth" term is the transmission latency which is proportional to the bitstream size. The other_latencies term includes propagation latency and other latencies such as system response latency, software latency, and so forth. These latencies are grouped in the term "other_latencies" because these latencies are not related to the bitstream size and could change randomly. The linear relationship can be simplified to the linear y-intercept form equation:

$$d = \alpha s + \beta \quad (2)$$

where s is the bitstream size, d is the latency, a is a slope parameter (1/bandwidth), and β is the y-intercept parameter (as the other_latencies).

The determining of the relationship function 406 may include "determine relationship function parameters" 408. Particularly for every frame, weighted linear regression (WLR) may be used to calculate coefficients α and β, which are used to describe a linear relationship between bitstream size and latency. A WLR algorithm equation (3) recited below is used to fit equation (2) and the fitting is accomplished by estimating the parameters α and β by computing a minimum weighted mean square error (MSE) with the last L feedback pairs of (s'$_n$, d$_n$), ... (s'$_{n-L}$, d$_{n-L}$). This relationship can be expressed as:

$$(\alpha, \beta) = \operatorname{argmin}_{\alpha,\beta} \sum_{t=0}^{L} \omega_t^2 [(\alpha s'_{n-t} + \beta) - d_{n-t}]^2 \quad (3)$$

where ω$_t$ of is the weight of the MSE of the n-t frame, where there is the count of frames in the network status buffer up to L as mentioned above. The weight value can be increased for earlier frames (with a smaller t buffer frame count) to prioritize newer data when desired. The weights may be predetermined and determined by heuristics.

Process 400 may include one example way to solve equation (3). This may include "compute latency and bitstream size linear regression weighted means for predetermined number of past frames" 410 and "use mean square error" 412. In detail, the solution of the WLR equation first includes finding the separate means of bitstream size and latency for L frames, and then using the means to solve for the parameters α and β as follows:

$$m_s = \sum_{t=0}^{L} \omega_t s'_{n-t} / \sum_{t=0}^{L} \omega_t \quad (4)$$

$$m_d = \sum_{t=0}^{L} \omega_t d_{n-t} / \sum_{t=0}^{L} \omega_t \quad (5)$$

$$\alpha = \sum_{t=0}^{L} \omega_t^2 (d_{n-t} - m_d)(s'_{n-t} - m_s) / \sum_{t=0}^{L} \omega_t^2 (s'_{n-t} - m_s)^2 \quad (6)$$

$$\beta = m_d - \alpha m_s \quad (7)$$

With equations (6) and (7), sometimes either or both of parameters α and β may be negative values, which are meaningless. In this case, if either parameter α or β or both are negative, the parameters are alternatively calculated by equations (8) and (9):

$$\alpha = m_d / m_s \quad (8)$$

$$\beta = 0 \quad (9)$$

Process 400 may include "detect abrupt changes in network status" 414. This includes analyzing feedback pairs $(s'_n, d_n)$ to detect sudden network status change. Specifically, an outlier to the linear regression model as exemplified in equations (1) to (9) above can indicate a modified target bitstream size is needed to perform a quick adjustment to the bitstream so that the bitstream size can still satisfy a latency threshold.

Figure 7:
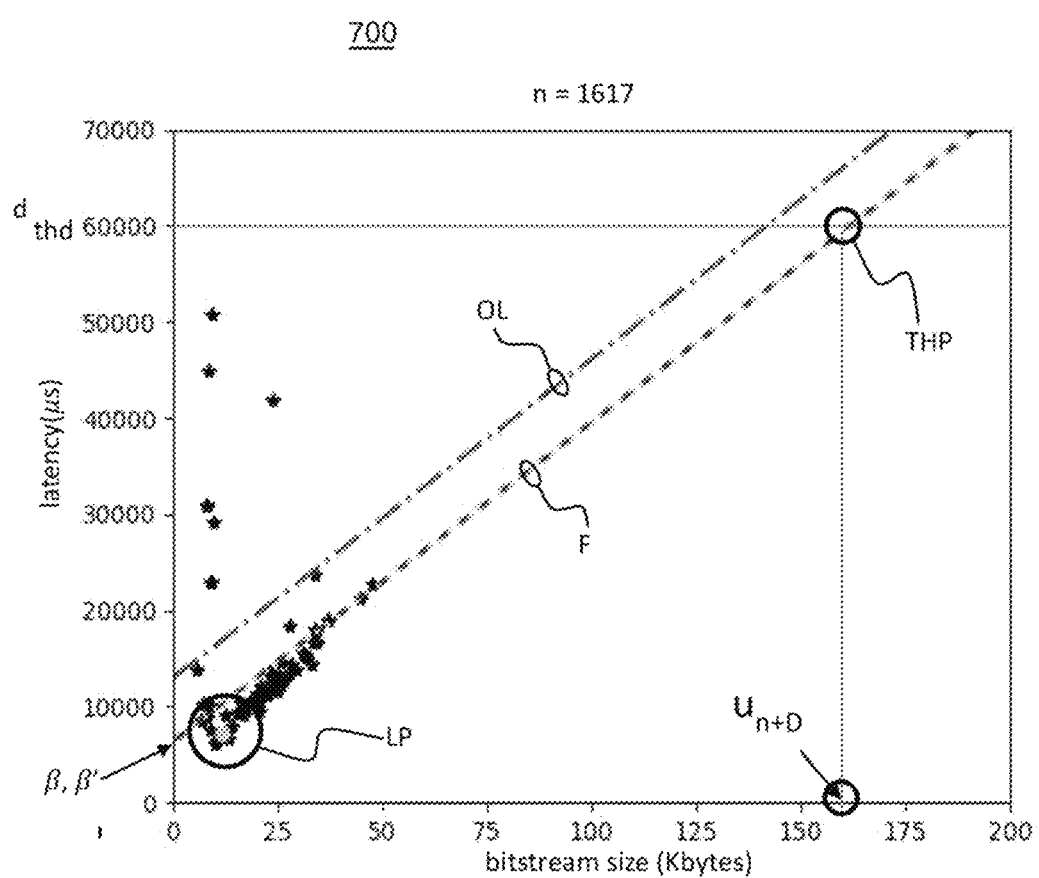
FIG. 7 is yet another graph showing latency per bitstream size used to set the bitstream size according to at least one of the implementations herein.

Referring to FIG. 5 for example, a graph 500 shows the operation of the linear regression model and how outliers can be identified graphically. The graph 500 charts bitstream size versus latency feedback where the bitstream size is both feedback (actual) and target bitstream size. The scattered points are each the feedback points or pairs $(s'_{n-1}, d_{n-1}), \ldots (s'_{n-L}, d_{n-L})$ being used to compute the means in equations (4) and (5) recited above. The point LP at the enlarged circle is the last (or most recent) point $(s', d_n)$ being held in the network status buffer. The linear regression model (or relationship function line) is represented by dashed line F for a particular parameter β. The position of the function line F (here from left to right when the bitstream size is on the x-axis) depends on the value of the parameter β as the y-intercept parameter while parameter α controls the slope of function F as mentioned above. On graph 500, once the function F is positioned on the graph, the intersection THP of the function F with a latency threshold $d_{thd}$ can be determined. This determines the initial target bitstream size by projecting the intersection THP down to the x-axis of the graph. The intersection and projection describes the operation of the reaction model unit 310 (FIG. 3) described mathematically below. Graph 500 shows analysis for a frame n=1615 in a series of frames with graph 600 (frame n=1616 on FIG. 6) and graph 700 (frame n=1617 on FIG. 7) used below for outlier handling.

Returning to the determination of an outlier, process 400 may include "detect outlier of relationship function" 416. This operation may be handled by the outlier detection and handling unit 308, and may include "use the latest feedback sample pair" 418. Particularly, an outlier $(s'_n, d_n)$ is a feedback point that does not fit onto, or is not at least sufficiently near, linear function F (equations (3)) with certain parameter α and β values calculated by using the WLR. It also refers to when the network status has changed suddenly. In this case, the outlier detection may simply analyze the position of the last feedback $(s'_n, d_n)$ (LP) in in the set of L feedback points currently in memory or in the network status buffer so that the system has time to react to the sudden change in network status.

Process 400 may include "compare latest sample feedback pair to relationship function threshold" 420. Here, the weighted MSE (wmse) in the WLR is used as a criterion to detect the outlier and can be computed as follows:

$$wmse = \sum_{t=0}^{L} \omega_t^2 [(\alpha s'_{n-t} + \beta) - d_{n-t}]^2 / \sum_{t=0}^{L} \omega_t^2 \quad (10)$$

The weights and other variables in equation (10) are as already described for equations (3) to (9) above. The latency threshold can be expressed as $$d = \alpha s + \beta + sqrt(\mu * wmse) \quad (11)$$

where μ is a constant determined by experimentation. If the square error of feedback point $(s'_n, d_n)$ approximated by equation (10) with L=0 (and including the weighting) is larger than u*wmse, then feedback point $(s'_n, d_n)$ is an outlier that does not fit onto, or is not sufficiently near, the linear model relationship function line F. As shown on graphs 500, 600, and 700 (FIGS. 5-7), the function threshold is shown as a broken outlier line (OL) offset but parallel to the function line F. Referring again to graph 500, it can be seen that last feedback point LP is still below the outlier threshold line OL so that no outlier exists here. In graph 600 (FIG. 6), however, last feedback point LP is above the threshold line OL so that the LP is an outlier point.

In the case where LP is an outlier point, process 400 may include "adjust one or more of the parameters when an outlier exists" 422. By one approach, only the parameter β is changed here because the parameter β is the more likely parameter to change abruptly since the parameter β indicates the "other" latencies that are more unstable such as time spent in the queue of a router, software response latency, and so forth, and versus the parameter α. In this case, parameter β is adjusted to a parameter β' to have the adjusted linear model fit this outlier feedback point $(s'_n, d_n)$. The adjusted parameter β' may be calculated by:

$$\beta' = \begin{cases} d_n - \alpha s'_n, & \text{if } (\alpha s'_n + \beta - d_n)^2 > \mu * wmse \\ \beta, & \text{else} \end{cases} \quad (12)$$

As shown on graph 500 where no outlier exists, parameter β=β' and the linear function F does not move. Graph 700 (FIG. 7) shows another example where the LP is close to the function line F and no outlier is detected. In graph 600 (FIG.

6), however, linear function F is moved, here horizontally to the left, to intersect the outlier last feedback point (LP) and create an adjusted or shifted function line (FO) for the outlier point. The adjusted function line FO now shifts the latency threshold intersection point THP to the left as well. It will be noted that outlier adjustment parameter β' may be determined each time a new feedback pair or point (s'$_n$, d$_n$) is received and added to the network status buffer.

Process 400 then may include "generate an initial target bitstream size for a current frame" 424, and this may be performed by the reaction model unit 310 as mentioned. Once parameters α and β' are obtained, and with the relationship function between bitstream size and latency being: d=αs+B', the maximum bitstream size u$_{n+D}$ that should be used to encode a next frame with the latency threshold d$_{thd}$ is as follows:

$$u_{n+D} = (d_{thd} - \beta')/\alpha \qquad (13)$$

The results can be shown in the graphs. Graph 600 shows a network status drop is detected with a large latency above the function threshold line OL, and the parameter β was adjusted to B' as shown by the adjusted function line FO. Thus, the initial target bitstream size U$_{n+D}$ can be decreased very quickly at frame n=1616 to react to the sudden network status change. The target bitstream size U$_{n+D}$ then can be provided to an encoder to adjust encoder settings, or better here, provided to an output filter 312 (FIG. 3) for refinement to be more adaptable for a better efficiency-image quality balance by using reinforcement learning.

Figure 8:
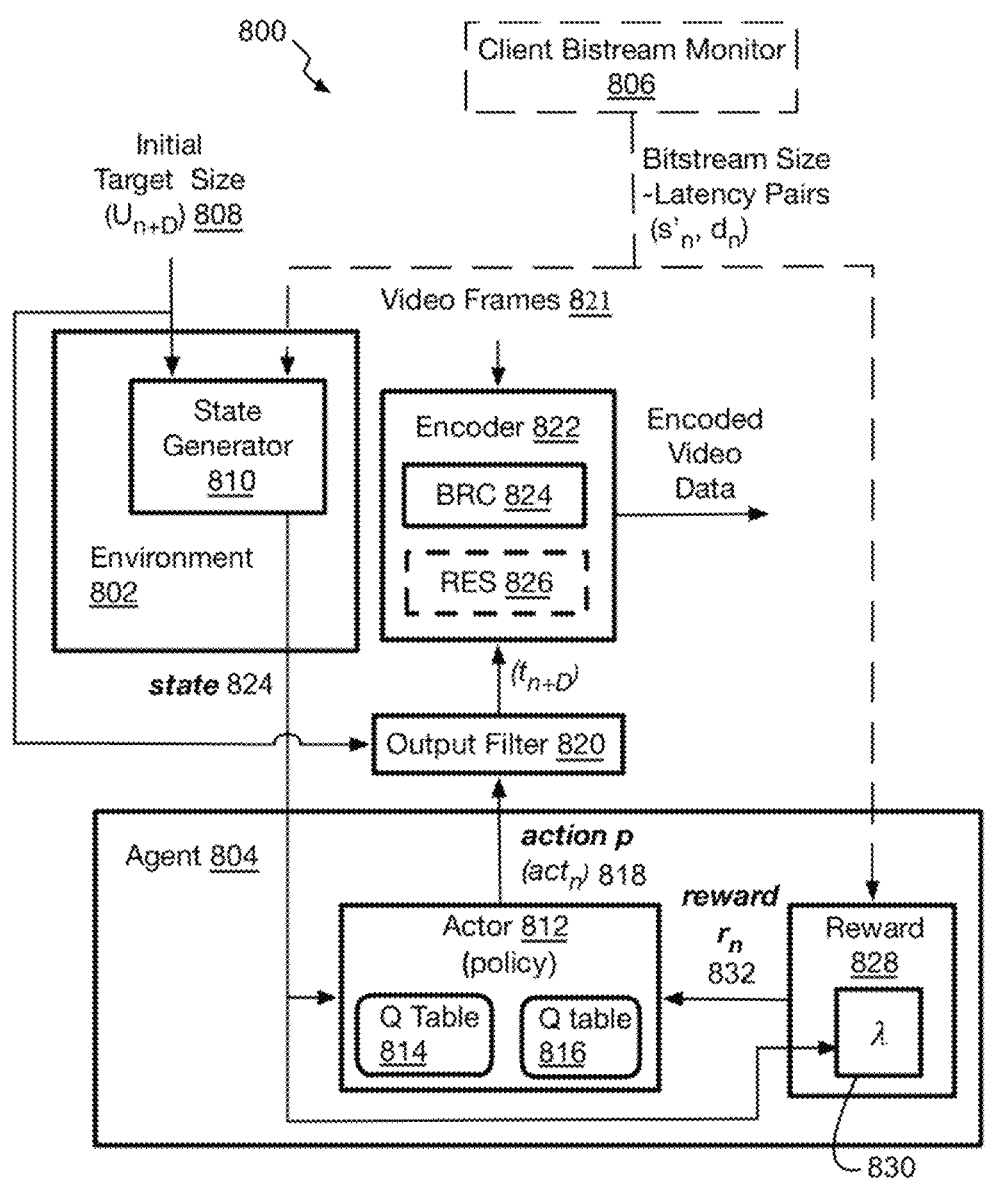
FIG. 8 is a schematic diagram of a reinforcement learning unit according to at least one of the implementations herein.

First referring to FIG. 8, a reinforcement learning (RL) unit (or system or device) 800 may be used to perform the reinforcement learning operations of process 400, and may be the same or similar to RL unit 314 (FIG. 3). The RL unit 800 may have an environment unit 802 and an agent unit 804 that both receive the feedback pairs or points (s'$_n$, d$_n$) from a client bitstream monitor 806, and which may or may not be considered a part of the RL unit 800. The environment unit 802 as well as an output filter 820 receives the initial target bitstream size U$_{n+D}$. As shown in FIG. 3, the L feedback points (s'$_n$, d$_n$) may be obtained from the network status buffer, while the initial target bitstream sizes U$_{n+D}$ also may be retrieved from a buffer storing the initial target bitstream sizes for M frames, where M is L plus the next frame 821 to be encoded. The output filter 820 provides an output target bitstream size t$_{n+D}$ to an encoder 822 to encode the video frame 821 using the output target bitstream size.

In more detail, the environment unit 802 may have a state generator unit 810 to generate states to be provided to the agent 804. The agent 804 has an actor unit 812 (or just actor) with a policy, here being a double Q-learning policy in this example, and that uses two Q tables 814 and 816. The actor 812 generates actions ρ (818) provided to the output filter 820 which uses the actions to generate output bitstream sizes t$_{n+D}$ that are provided to the encoder 822. The encoder 822 may have a bitrate control unit 824 or a resolution unit 826 or both to use the output target bitstream size to adjust the bitrate at the encoder. The bitrate control unit 824 and/or resolution unit 826, may or may not be considered part of the encoder 822. The agent also has a reward unit 828 with a coefficient or ratio λ unit 830 to generate a reward value In 832. The reward is then used to refine or evolve the policy at the actor 812. Other details of the reference learning unit 800 are provided below with the description of process 400.

Returning to process 400, process 400 may start the RL process with "determine states using network status and initial target bitstream sizes" 426. Here, reinforcement learning unit 800 may provide, or may be considered to be, a reinforcement learning (RL) model that provides the action or parameter ρ to adapt to different environments and by learning the past sizes and latencies (as the states indicate the environment). The RL model or unit 800 generates a proper policy (with different actions for different states) by performing an RL analysis or method that starts learning from zero (without any prior knowledge) for each session that starts with a new or first video sequence. A single session could include multiple video sequences as long as a connection between client and server (or image processing device) is maintained during a single session. The RL can be a good algorithm to find a best policy in a short time. Thus, the RL model here has just a few discrete states and actions, and its output action ρ may be the only output parameter to refine the initial target bitstream size at the output filter.

More particularly, this operation 426 may include "determine individual states as bitstream size feedback trend, latency feedback trend, and initial target bitstream size trend" 428. Each state in the RL model may have three sub-states: trend of bitstream size feedback s'$_n$, trend of latency feedback d$_n$, and trend of initial target bitstream size U$_{n+D}$. All three trends may be calculated in a similar way as described below. By one approach, the data of the last feedback point (LP) is compared to the mean of the data of the previous feedback points for M feedback points. If the gap between the data of the last feedback point and mean is larger than the sqrt(MSE), then the trend is up or down. Otherwise, the trend is steady (or non-changing), as follows.

For the bitstream size trend:

$$ms_n = \sum_{t=1}^{M} s'_{n-t}/M \qquad (15)$$

$$sms_n = \sqrt{\sum_{t=1}^{M}(s'_{n-t} - ms_n)^2/M} \qquad (16)$$

$$trs_n = \begin{cases} \nearrow, & \text{if } s'_n > ms_n + sms_n \\ \rightarrow, & \text{if } ms_n - sms_n \leq s'_n < ms_n + sms_n \\ \searrow, & \text{if } s'_n < ms_n - sms_n \end{cases} \qquad (17)$$

For the latency trend:

$$md_n = \sum_{t=1}^{M} d_{n-t}/M \qquad (18)$$

$$smd_n = \sqrt{\sum_{t=1}^{M}(d_{n-t} - md_n)^2/M} \qquad (19)$$

$$trd_n = \begin{cases} \nearrow, & \text{if } d_n > md_n + smd_n \\ \rightarrow, & \text{if } md_n - smd_n \leq d_n < md_n + smd_n \\ \searrow, & \text{if } d_n < md_n - smd_n \end{cases} \qquad (20)$$

For the initial target bitstream size trend:

$$mu_{n+D} = \sum_{t=1}^{M} u_{n+D-t}/M \qquad (21)$$

$$smu_{n+D} = \sqrt{\sum_{t=1}^{M}(u_{n+D-t} - mu_{n+D})^2/M} \qquad (22)$$

$$tru_{n+D} = \begin{cases} \nearrow, & \text{if } u_{n+D} > mu_{n+D} + smu_{n+D} \\ \rightarrow, & \text{if } mu_{n+D} - smu_{n+D} \le u_{n+D} < mu_{n+D} + smu_{n+D} \\ \searrow, & \text{if } u_{n+D} < mu_{n+D} - smu_{n+D} \end{cases} \qquad (23)$$

The individual state representing the reinforcement learning environment can then be expressed as the three trends as:

$$st_n = [trs_n, trd_n, tru_{n+D}] \qquad (24)$$

where the state in the RL is defined as the combination of the three sub-states: $[trs_n, trd_n, tru_{n+D}]$ in a digit value [0, 0, 0] where the first sub-state may indicate the bitstream size feedback trend direction, the second sub-state indicates the latency feedback trend direction, and the third sub-state indicates initial target bitstream size trend direction. Each sub-state can have one of three available values (up, steady, down), so that a total of 27 possible different states exists in the RL analysis each with a different combination of trend directions. By one example, each sub-state can have any of the trend directions including up=0, same/steady=1, and down=2 for the three available trend types, although more or less trend classes could be used. It will be understood that each of the three available trend values may be kept in binary in two digits each (00, 01, and 10).

Once the state is generated, process 400 may include "determine an action with an actor policy using the states" 430. As to the actor policy, in most cases the policy cannot be calculated by a closed-form equation. Thus, Monte-Carlo methods are used here (described in greater detail below), and only a few states and actions are used. In the present example, a double Q-learning policy is used at the actor (at the agent) to determine the best policy as soon as possible. As with many RL policies, the agent policy algorithms, including the double Q-learning, may be selected to maintain a very good balance between 'exploit' decisions previously made with known results versus 'explore' decisions where new solutions are tried for states that were not experienced before and where both the chances of success as well as the risk of failure are much greater. So alternatively, a number of different reinforcement learning algorithms could be used as the RL policy instead of the double Q-learning, such as a deep Q-learning network (DQN), double deep Q-learning network (DDQN), asynchronous advantage actor-critic (A3C), Rainbow, a deep deterministic policy gradient (DDPG) RL algorithm, and so forth. DDPG may be considered as a combination of a deep Q-learning network (DQN) and an actor-critic (AC) network. Some may be limited or unusable when considering computational complexity.

Figures 8A, 9:
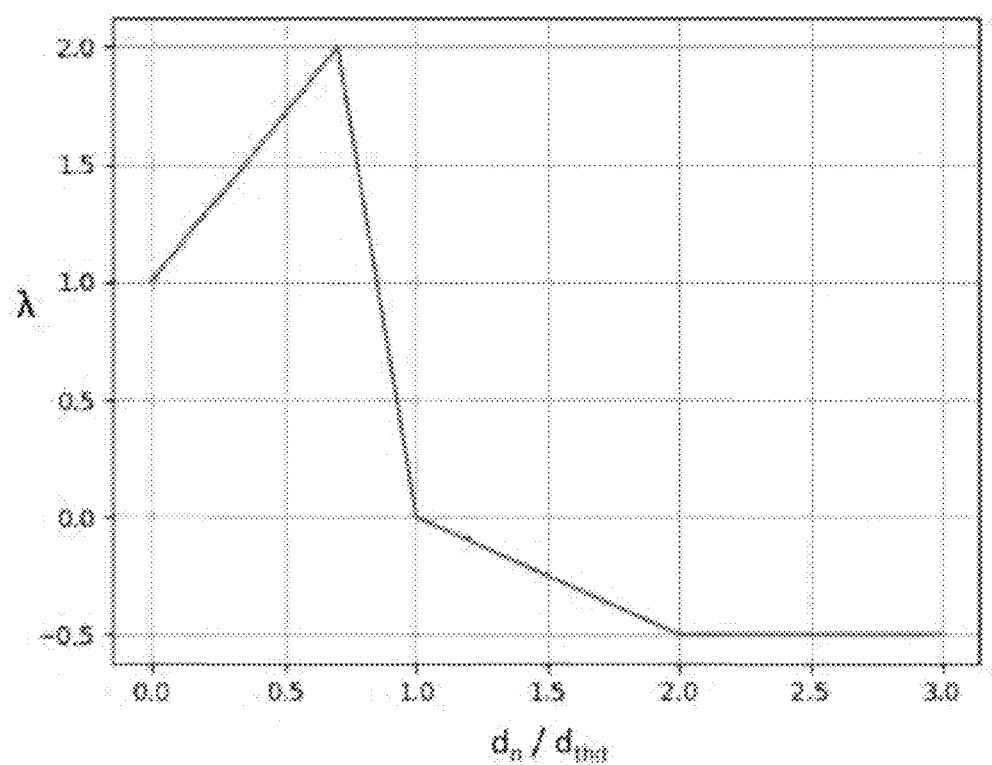
FIG. 8A is a schematic diagram of an example reinforcement learning Q-learning table according to at least one of the implementations herein.
FIG. 9 is a graph showing latency per reward ratio for reinforcement learning according to at least one of the implementations herein.

Referring to FIG. 8A, and returning to the example herein to generate an action with double Q-learning, process 400 may include "use double Q-learning with tables Q1 and Q2 included in the actor policy" 432. Specifically, two tables may be generated and stored that both list or index table Q values by state and available action value. By one example, each available state st may have or be indexed by a row while each available action value p may have or be indexed by a column (or vice-versa). In the example described herein, each table Q1 and Q2 may have a row for each of the 27 available for rows 0 to 26, while three different actions values may be provided for ρ: 0.1, 0.5, 0.8, respectively corresponding to slow, medium, or fast frame to frame changes to the output bitstream size. The action values may be pre-set and determined by experimentation. This sets up two tables Q1 and Q2 of 27×3 elements. Such an example Q table Q1 or Q2 (814 of FIG. 8) is shown on FIG. 8A where actions are labeled as low, medium, and high (speed change) to refer to the slow, medium, and fast mentioned above.

Continuing with the example, the tables Q1 and Q2 may be initialized by setting all Q (or table) values or elements in the tables at an initial value determined by experimentation, such as 100. A relatively large initial table element value can permit the RL unit 800 to slightly delay providing the action when receiving rewards in a few frames at the beginning of the analysis in order to avoid being limited to a local optimal solutions too fast. However, if the initial table value is too large, the RL analysis could take too long to converge. Otherwise, the initialization should occur only once after a session is started by a connection to the server (or image processing device) and may carry over through multiple video sequences in a single session to take advantage of the RL learning from prior video sequences.

Each table value or element in the tables Q1 and Q2 may be indicated as $Q(st_n, act_n)$ for frame n where $act_n$ is the selected (or column) action p. The computation of the table value can be expressed as an expectation equation. For example, the table value for $Q(st_n, act_n)$ may represent the expected total reward in the future if the system 100 or 300 (or 800) uses action $act_n$ in state $st_n$ at frame n to encode a next frame. Specifically, once the next frame n+1 is encoded, the RL unit 800 receives new feedback pair data $(s'_n1, d_{n+1})$. Also with the encoding of the next frame $s_{n+1}$, a reward $r_{n+1}$ (derived from equation (32) below) factors a new state $st_{n+1}$ (derived from equation (24) above) for the next frame. The state $st_{n+1}$ will indicate action $act_{n+1}$ on the Q tables. With these definitions and framework, the relationship of $Q(st_n, act_n)$ and $Q(st_{n+1}, act_{n+1})$ can be expressed as:

$$Q(st_n, act_n) = E\{r_{n+1}\} + \eta * E\{Q(st_{n+1}, act_{n+1})\} \qquad (25)$$

where E{ } refers to expectation. Since the feedback pair $(s'_{n+1}, d_{n+1})$ is not completely determined by $st_n$ and $act_n$ alone, these can be random values. Also, the constant η may be limited to $0<=\eta<=1.0$. The constant η is a factor used to prioritize the reward received in a nearer future, e.g., where η=0 refers to when only the reward in the next frame is being considered rather than any portion of the Q value form the Q tables.

As introduced before, Monte-Carlo methods may be used to calculate $Q(st_n, act_n)$ because the exact distribution of $(s'_{n+1}, d_{n+1})$ is unknown. The basic idea of Monte-Carlo methods is to use an average of multiple samples to replace the expectation. For example, to calculate expectation E{A} where 'A' is a random value with an unknown probability distribution, 'A' may be sampled multiple times and then an expectation E'(A) may be calculated as an approximation of E{A}. Initially, E'(A) may be set as $A_0$ which is the first observation of random value A. After observing $A_n$ for an nth time, the expectation may be updated as:

$$E'(A) = (1 - \xi) * E'(A) + \xi * A_n \qquad (26)$$

So to apply the Monte-Carlo method in the present example, from equation (26) equation (25) can be restated as:

$$Q(st_n, act_n) = (1 - \xi)Q(st_n, act_n) + \xi * [r_{n+1} + \eta * Q(st_{n+1}, act_{n+1})] \quad (27)$$

where ξ is the learning rate such that with a smaller value of ξ, the Q table changes slower. No expectation E{ } term exists in equation (27) now (versus equation (25)), and the Q tables can be updated using the rewards and during a runtime as described in greater detail below, in order to update the policy when the network status changes. The generation of the rewards and updating of the tables to evolve the Q values on the table are described further below.

As to the selection of the action depending on the table values on the Q tables, process 400 may include "use maximum state Q-table value or sums" 434. Here, action $act_n$ is chosen at state $st_n$ to maximize the $Q(st_n, act_n)$:

$$\rho = act_n = \text{argmax}_a Q(st_n, a) \quad (28)$$

where a is each of the available actions for any single state. As mentioned above, three actions are available for ρ (or a) including (0.1, 0.5, 0.8).

In operation, once the state is determined, the state is looked up, and all of the table values for that state are compared. As mentioned, each table value may be associated with a different action value, By one approach, the action associated with the maximum table value is selected as the best action for the encoding of the next frame. In this case, the tables may be used alternatively or in round robin fashion as frames of a video sequence are being encoded.

By another alternative, however, the table values associated with the same action from both Q tables Q1 and Q2 are first summed, and the action associated with the column with the maximum sum is used as the best action for the encoding of the next frame. In other words, a best action is selected according to the sum of the Q1 and Q2 tables as.

$$act_n = \text{argmax}_a Q1[st_n, a] + Q2[st_n, a] \quad (29)$$

For example, say tables Q1 and Q2 provide the following data, and it was determined state 10 is the current state for the RL environment. Thus, state 10 is looked up on the tables as follows.

TABLE Q1

| Action: | 0.1 | 0.5 | 0.8 |
|---|---|---|---|
| Index: 10 | 55 | 60 | 70 |

TABLE Q2

| Action: | 0.1 | 0.5 | 0.8 |
|---|---|---|---|
| Index: 10 | 60 | 40 | 40 |

Then, the table values in similar columns or corresponding locations, and in turn associated with the same available action value, are summed. In this example, the sums would be for action 0.1:115, for action 0.5:100, and for action 0.8:110. Thus, action 0.1 is selected since 115 is the maximum sum. Other variations could be used.

Process 400 also may include "choose the action randomly" 436. Thus, by one form, the above maximizations may be used for all frames. By another approach, some proportion of the frames will have their actions chosen somewhat randomly. By one option, the randomization proportion may be pre-set, such as having 95% of the actions $act_n$ selected by the maximization and having 5% of the actions chosen randomly among the available actions for a state. Thus, the random selection ay be performed at intervals such as every 20 frames in this case, the RL unit will randomly choose among the three available actions for a single state (and a specific table does not need to be referred to). This is performed in order to enhance the explore side of the RL analysis and have a better chance of selecting a global best strategy. Once the action $act_n$ (or ρ) is selected, the action may be provided to the output filter 820 for example.

Process 400 then may include "refine the target bitstream size" 438. Here, the initial target bitstream size $U_{n+D}$ is obtained from the reaction model 310 of the bitstream size adapter 300. The output filter 820 uses the action ρ to refine the initial target bitstream size $U_{n+D}$ to control the speed in which the target bitstream sizes are changing from frame to frame and by providing a certain value of the output bitstream size $t_{n+D}$. By having the output filter 820 using only one scalar coefficient ρ significantly simplifies the reinforcement learning so that the reinforcement learning can start without any prior knowledge during runtime and still converge to a best policy very quickly to provide a good user experience.

As mentioned, the use of the RL provides adaptability while the bitstream size changes, changes at varying speeds, and in different environments. For example, a user may be riding in a moving vehicle where the network status may drop and keep oscillating (recovers, then drops, then recovers, etc.). In this case, the target bitstream size is expected to drop quickly but recover slowly. Also, when a user is at home, the WiFi network status may drop but recover very quickly. In this case, the target bitstream size is expected to drop slowly but recover quickly.

To provide an appropriate output target bitstream size in any of these situations, process 400 may include "use RL action" 440. Here then, the output filter may use a linear infinite impulse response (IIR) filter to control the changing of target bitstream size at varying speeds after an initial target bitstream size $U_{n+D}$ is provided. The output target bitstream size may be computed as:

$$t_{n+D} = (1 - \rho)t_{n+D-1} + \rho U_{n+D} \quad (30)$$

where $t_{n+D}$ is the output target bitstream size, and action ρ is used as a size parameter (or filter coefficient or weight). Since a single parameter is used here to control the varying speed of change from frame to frame of target bitstream size, this operation does not add significant delay. Also, the operations of both the reaction model and output filter are linear as well so that these operations also reduce complexity and computational load while also being very useful.

Process 400 may include "adjust encoder settings depending on the output target bitstream size" 442. Here, the encoder 822 may have the bitrate control unit 824 receive the output target bitstream size, and along with many other factors, use the output target bitstream size to set a bitrate for encoding and bitstream transmission of a next frame. The bitrate controller of the encoder 822 may use the a bitstream size (in bytes or kbytes) in this example to compute a QP to set the bitrate by providing the QP to the quantization unit of the encoder, whether to adjust for updated or different target bitrates, compression efficiency, image complexity, image quality, stability, and so forth. The bitrate controller also may limit the QP to thresholds for example. By an alternative, the actor policy of the RL algorithm also may consider all or most of the factors that the bitrate controller is considering so that the bit rate controller does need to make any other adjustments to the QP.

The next frame then may be encoded where the QP is used by the encoder to quantize the residuals from upstream on the encoder, which in most cases is in discrete cosine coefficient (DCT) form when ready for quantization. The residuals are then entropy encoded and placed in the bitstream, and decoded on the decoding loop of the encoder for use to generate predictions. The actual resulting bitstream size $s_{n+D}$ should be very close to the output target bitstream size $t_{n+D}$.

Otherwise, the resolution unit 826 of the encoder 822 may reduce the resolution of the input rendered frame being provided to the encoder in the first place in order to be able to reduce the bitrate for encoding the next frame when needed. The resolution unit 826 may be considered a pre-processing unit of the encoder.

While the operations 402 to 442 described above are used to perform the encoding with the reinforcement learning, the following operations 444 and 446 are more directed to updating the parameters of the actor policy of the RL unit 800 so that the provided action results in the best encoder setting according to the desired bitstream size control factors discussed above. The goodness of the actor is indicated by a reward. The rewards are used to set the table values on the Q tables Q1 and Q2. The double-Q learning method uses two tables Q1 and Q2 to avoid overfitting. At each frame, one of the tables is selected randomly to be updated and while using the value from the other table.

A reward model may be used that generates the reward $r_n$ due to a round trip time and that reflects the results of an earlier action made at frame n-D. Thus, the Q tables should be updated with each entry of $st_{n+D}$ and $act_{n+D}$ after receiving $r_n$. The RL algorithm uses the reward to learn how to react to maximize the expected total reward in the future. A positive reward is similar to an award to encourage the RL unit to generate a correct action, while a negative reward is similar to a penalty to punish the RL unit for generating a wrong action. After receiving the reward $r_n$, the RL model updates its policy, targeted to maximize the expected total reward received in the future.

In more detail, process 400 may include "generate rewards using the network status and the states" 444. In cloud gaming, users expect more bytes for higher quality, while better ensuring latency is maintained below an acceptable threshold. Thus, in order to avoid any delay in generating and using the rewards for RL, the last feedback pair received at the server or image processing device also is used here. This includes using the bitstream size feedback and E2E latency feedback $(s'_n, d_n)$, to calculate the reward $r_n$. First, however, a discount factor or ratio is used and is computed as:

$$\lambda = \begin{cases} 1.4286 * d_n/d_{thd} + 1, & \text{if } d_n/d_{thd} \leq 0.7 \\ 6.667 - 6.667 * d_n/d_{thd}, & \text{if } 0.7 < d_n/d_{thd} \leq 1.0 \\ 0.5 - 0.5 * d_n/d_{thd}, & \text{if } 1.0 < d_n/d_{thd} \leq 2.0 \\ -0.5, & \text{if } d_n/d_{thd} > 2.0 \end{cases} \quad (31)$$

where the ratio λ depends on, or is, a weighted proportion (or ratio) of latency feedback relative to the latency threshold. The numbers in the equation are weighting factors that are determined by experimentation. The reward is then computed as:

$$r_n = \lambda s'_n \quad (32)$$

Referring to FIG. 9, and with this arrangement, the reward $r_n$ is proportional to the bitstream size feedback $s'_n$. Thus, when the ratio λ is positive, more bytes are sent by the encoder to the client, and the reward reflects a higher award. Otherwise, if ratio λ is negative, when more bytes are sent, this raises the penalty. The relationship of the ratio λ with the "unified" latency (or latency ratio) $d_n/d_{thd}$ is shown on graph 900. Rewards are higher when the latency $d_n$ is about $0.7*d_{thd}$ where the ratio λ is a maximum, and in turn the reward $r_n=\lambda*s'_n$ also is a maximum. When the latency $d_n > d_{thd}$, λ becomes negative and the reward becomes a penalty.

It will be appreciated that a different combination of factors, whether those mentioned or different factors, could be used as the reward depending on what is considered important criteria for bitstream size and bitrate control, or whether an encoder setting itself is generated as the action.

Process 400 may include "use the rewards to update values on the Q-tables" 446. As mentioned, which table Q1 or Q2 is to be updated is selected randomly or 50/50. When table Q1 is being updated, a corresponding value in table Q2 is used to perform the updating where at least a portion of the corresponding value is factored into the equation as follows.

$$Q1(st_{n-D}, act_{n-D}) = (1-\xi)Q1(st_{n-D}, act_{n-D}) + \xi*[r_n + \eta Q2(st_n, act_n)] \quad (33)$$

Similarly, when table Q2 is being updated with a corresponding value from table Q1, the equation is as follows:

$$Q2(st_{n-D}, act_{n-D}) = (1-\xi)Q2(st_{n-D}, act_{n-D}) + \xi*[r_n + \eta Q1(st_n, act_n)] \quad (34)$$

The constants and variables are already defined above. The determination of an action and the updating of the tables with a reward may be performed for every frame when receiving a new feedback pair $(s'_n, d_n)$.

Experimental Results

To prove the effectiveness of the disclosed method, system, and device, a real cloud gaming solution was used with AVC encoding on Intel's SG1 platform on a public server, and a laptop was used as a client device to connect to a remote server communicating via public Wifi. The performance among three cases were compared: the disclosed method, a perQ method in WebRTC, and a normal variable bitrate (VBR) case. To test varying network status situations, the laptop was moved around a building interior multiple times in the exact same route for a fair comparison for each case. Along the route, a location existed where the network status drops.

Figure 10:
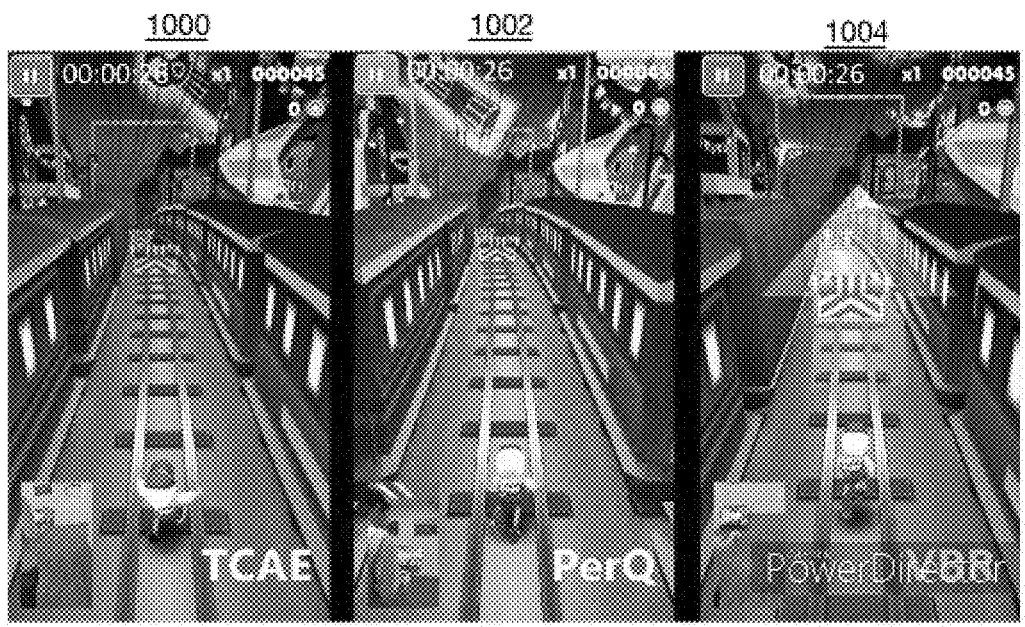
FIG. 10 is an image of three samples comparing conventional results to results of the currently disclosed method and system according to at least one of the implementations herein.
Figure 11:
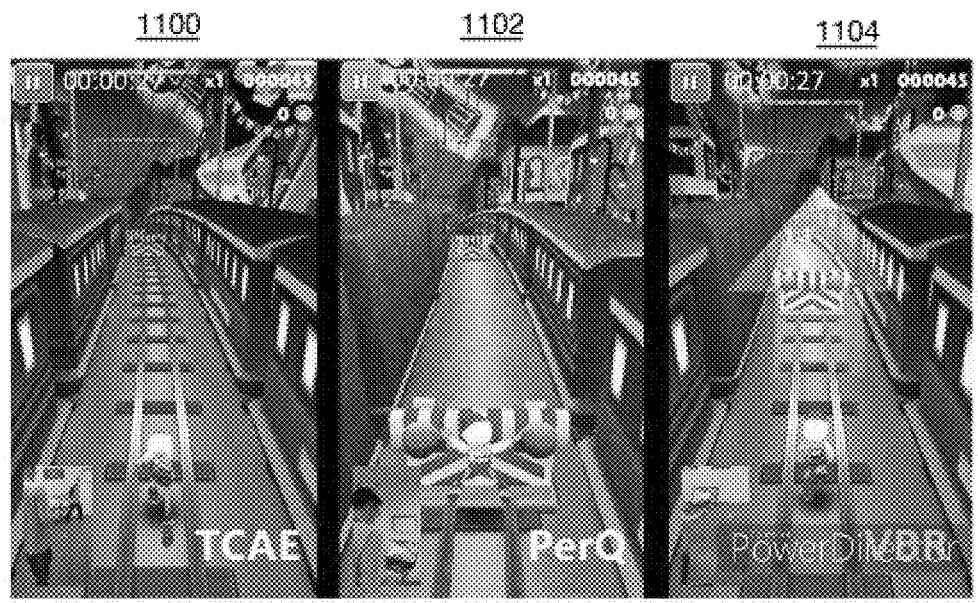
FIG. 11 is another image of three samples comparing conventional results to results of the currently disclosed method and system according to at least one of the implementations herein.
Figure 12:
FIG. 12 is yet another image of three samples comparing conventional results to the results of the currently disclosed method and system according to at least one of the implementations herein.

Referring to FIGS. 10-12, a video was created to compare the E2E experience among the three cases side by side. Screenshots of frames in FIGS. 10-12 of the video are shown for three adjacent seconds after moving the client through the low network status (low bandwidth) area. Each figure presents three video frames of the three video sequences at a same time. The time progresses from figure to figure from FIG. 10 to FIG. 12. The first or left frame 1000, 1100, and 1200 from the figures is generated by using the present method and is labeled "TCAE". The middle frames 1002, 1102, and 1202 are generated by using the perQ algorithm, and right frames 1004, 1104, and 1204 are generated by using normal VBR. The movement and location of the device is shown on a small screen on each frame in the figures.

From the screenshots of the three seconds, the screen content (frames 1004, 1104, and 1204) of the VBR case did not change at all because the screen on the client device froze due to the large latency. The visual quality of frames 1002, 1102, and 1202 of the perQ case significantly dropped due to the large amount of detail in the frame on the client's screen resulting in a noticeable blocky or pixelated appearance in spots. The disclosed method and system with frames 1000, 1100, and 1200 dropped the visual quality a small amount, but provides the best balance between visual quality, where surfaces and texture still appear mostly smooth, and latency was relatively low.

The VBR sequence had the highest latency, up to multiple seconds, when the network status changed, although its visual quality was good because the VBR system did not decrease the bitstream size even when the latency was unacceptably high.

With perQ, the bitstream size was adjusted according to networks status. The perQ system, however, was too cautious, and it took a long time to for the bitstream size to recover, so that the visual quality was the worst.

With the disclosed method and system, the bitstream size was adjusted according to network status. When the network status dropped, the latency did not increase a significant amount due to a quick reaction to change the target bitstream size, although the visual quality dropped slightly. After a while, the visual quality recovered to a normal level when the network status recovered. It is the smoothest case, and provides the best user experience.

Figure 13:
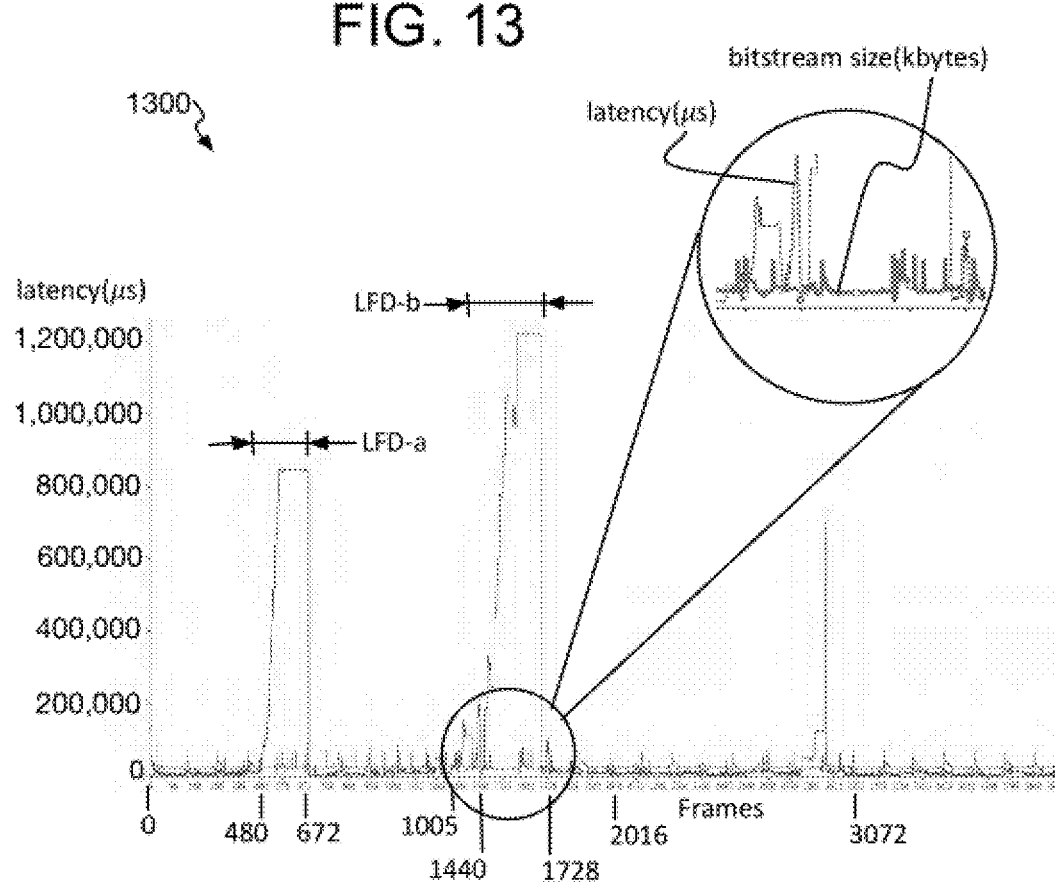
FIG. 13 is a graph showing latency in a conventional system.
Figure 14:
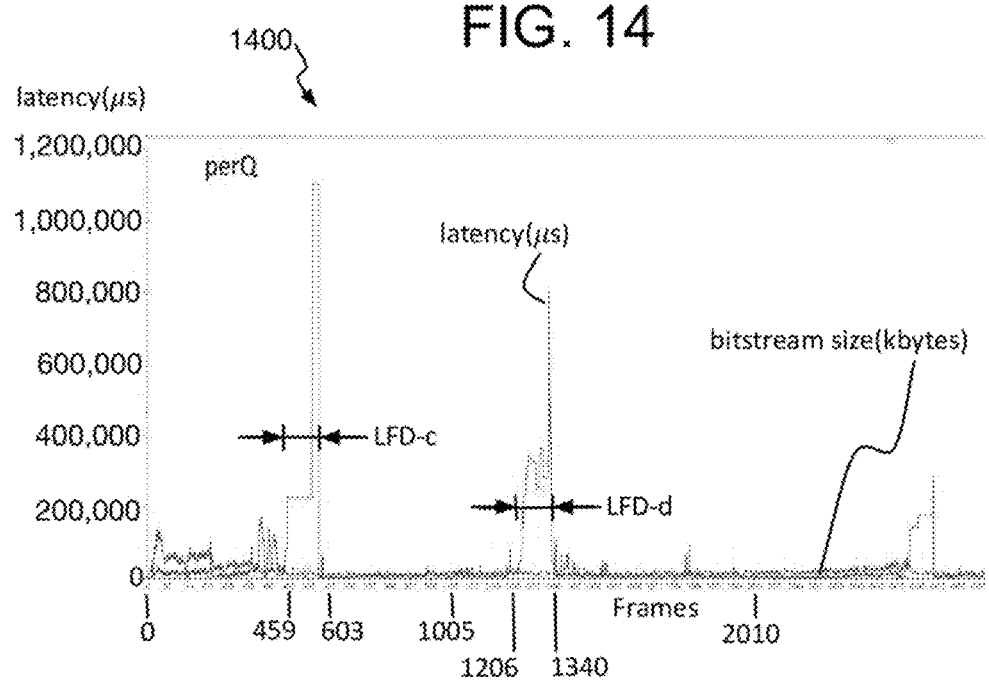
FIG. 14 is another graph showing latency in another conventional system
Figure 15:
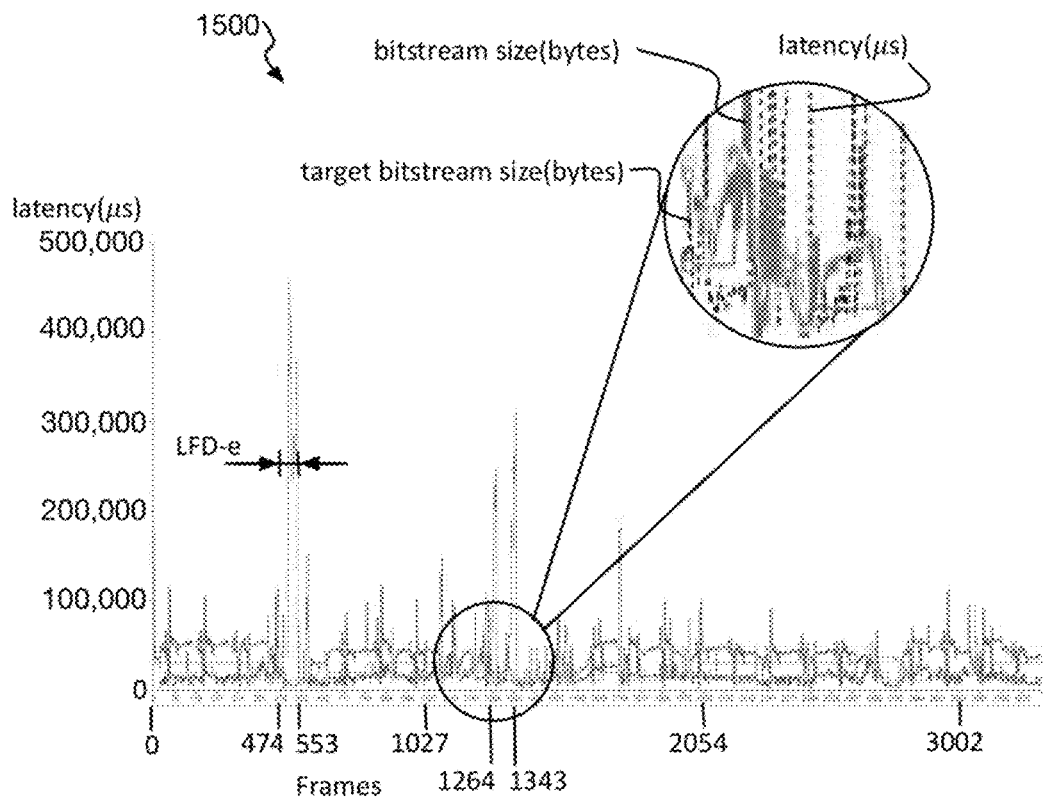
FIG. 15 is a graph showing latency in the presently disclosed system.

Referring to FIGS. 13-15, traces of bitstream size and latencies in the three tested cases are shown while encoding the video sequences of FIGS. 10-12. Each of FIGS. 13-15 provide a graph 1300, 1400, or 1500 respectively that provide a trace of bitstream size and latency in time versus latency in frames of the three cases, and which support the above conclusions. Graph 1300 is for the VBR case, graph 1400 is for the perQ case, and graph 1500 is for the present method and system. Graph 1500 also shows the output target bitstream size.

Graph 1300 shows very large latencies as latency frame duration (LFD) where LFD-a shows a latency of almost 200 frames and an LFD-b of almost 300 frames. Graph 1400 shows smaller but still significant latency.

Graph 1500 shows that the bitstream size feedback is very close to the target bitstream size due to the bitrate control in the encoder. From the trace, it can be seen that the reaction time of the present method is very quick to avoid accumulating latency. The output target bitstream size dropped very quickly when latency suddenly increased. This results in minimal peak latency compared with the perQ trace in graph 1400.

Graph 1500 also designates a region A where the network status was oscillating, and it can be observed that the speed of the changes of the target bitstream size slowed due to the RL module. The present method was working as intended being more cautious until the network status becomes stable. In a designated region B of the trace, the network status becomes more stable, and when the network status drops and recovers, the target bitstream recovers quickly again. This shows the RL unit used in the present method and system can adequately adjust to different network environments during a runtime.

While implementation of the example processes 200, 250, and 400 discussed herein may include the undertaking of all operations shown in the order illustrated, the present disclosure is not limited in this regard and, in various examples, implementation of the example processes herein may include only a subset of the operations shown, operations performed in a different order than illustrated, or additional or less operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the operations discussed herein and/or any portions the devices, systems, or any module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

As used in any implementation described herein, the term "logic unit" refers to any combination of firmware logic and/or hardware logic configured to provide the functionality described herein. The "hardware", as used in any implementation described herein, may include, for example, singly or in any combination, hardwired circuitry, programmable circuitry, state machine circuitry, and/or firmware that stores instructions executed by programmable circuitry. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. One of ordinary skill in the art will appreciate that operations performed by hardware and/or firmware may alternatively be implemented via software, which may be embodied as a software package, code and/or instruction set or instructions, and also appreciate that logic unit may also utilize a portion of software to implement its functionality.

As used in any implementation described herein, the term "component" may refer to a module or to a logic unit, as these terms are described above. Accordingly, the term "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

The terms "circuit" or "circuitry," as used in any implementation herein, may comprise or form, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor ("processor circuitry") and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system-on-a-chip (SoC), desktop computers, laptop computers, tablet computers, servers, smartphones, etc. Other implementations may be implemented as software executed by a programmable control device. In such cases, the terms "circuit" or "circuitry" are intended to include a combination of software and hardware such as a programmable control device or a processor capable of executing the software. As described herein, various implementations may be implemented using hardware elements, software elements, or any combination thereof that form the circuits, circuitry, processor circuitry. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Figure 16:
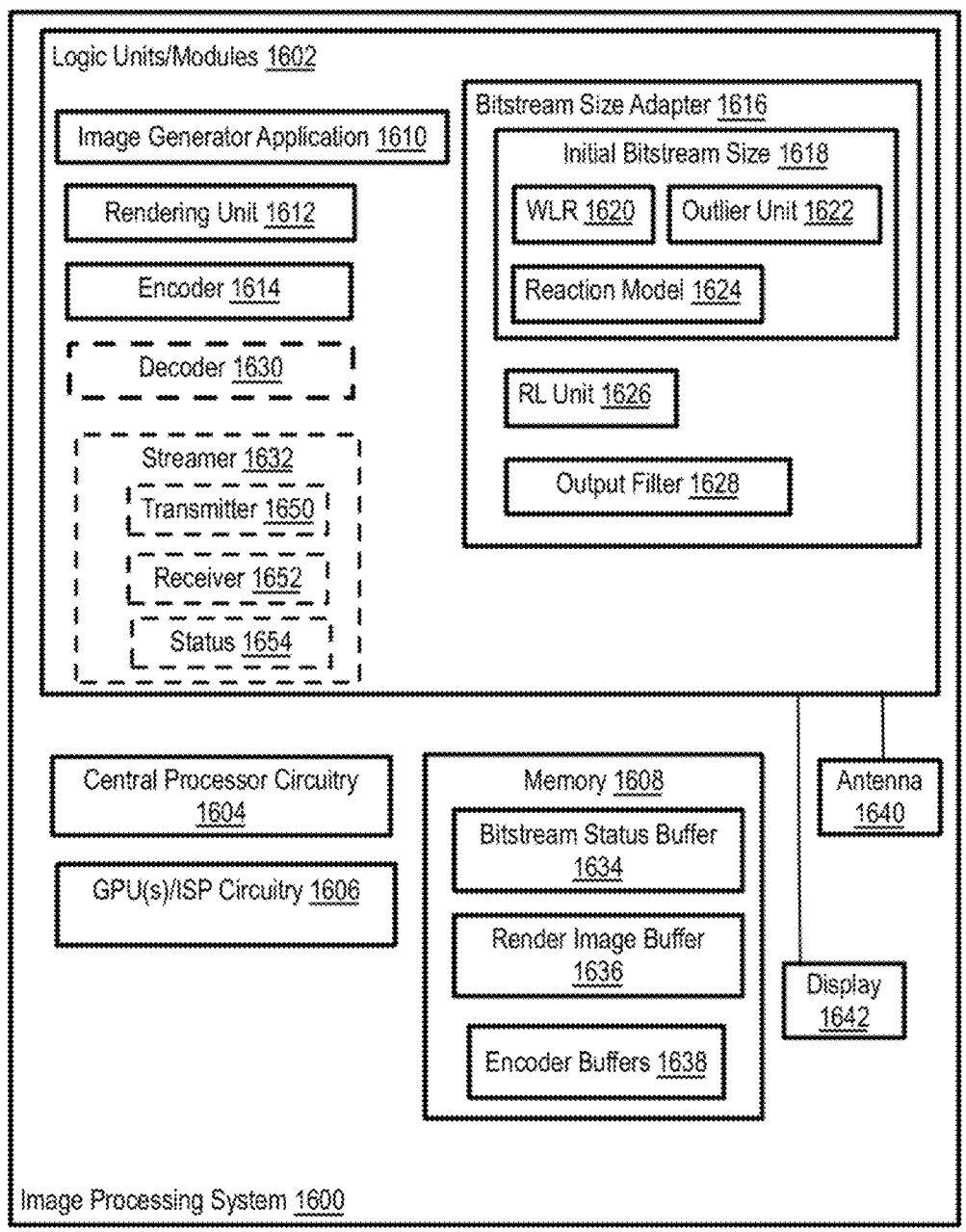
FIG. 16 is an illustrative diagram of an example system.

Referring to FIG. 16, an illustrative diagram of an example image processing system or device 1600 for video coding is arranged in accordance with at least some implementations of the present disclosure. The system 1600 may be the originating image processing device (or server) or multiple systems 1600 may be present being both the originator or the client. As shown on FIG. 16, system 1600 may include central processor circuitry 1604, at least one GPU and/or ISP circuitry 1606, logic units or modules 1602, and a memory 1608. The logic units 1602 may have an image generator unit 1610, a rendering unit 1612, an encoder 1614, and a bitstream size adapter 1616. The bitstream size adapter 1616 includes an initial target bitstream size unit 1618 with a WLR unit 1620, an outlier unit 1622, and a reaction model unit 1624. The bitstream size adapter 1616 also may have an RL unit 1626 and an output filter 1628. The logic units 1602 also may include a streamer 1632 with a transmitter 1650, receiver 1662, and a network status unit 1654 to generate the network status while the streamer transmits or receives the network status from client to a server or image processing system providing the rendered images such as system 1600 here.

Optionally a decoder 1630 also may be provided to decompress received compressed data. System 1600 also may have an antenna 1640 for transmission or reception of compressed image data and the like. A display 1642, whether local or remote, may be provided to display rendered images as mentioned above.

The details and operation of these components to perform the disclosed methods and operate the disclosed systems as suggested by the labels of the units are described above in any of the disclosed systems or methods.

In an implementation, the GPU and/or ISP circuitry 1606 may form whole or part of the bitstream size adapter 1616, RL unit 1626, and other components described above. The memory 1608 may store one or more bitstream size control units as disclosed herein and including a bitstream status buffer 1634 which may be a network status buffer and/or bitstream sizer buffer, a render image buffer 1636, one or more encoder buffers 1638 and so forth. Memory 1608 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 1608 may be implemented by cache memory.

Processor circuitry 1604 and 1606 may include any number and type of central, video, rendering, encoding, image, or graphics processing units that may provide the processors to perform the operations as discussed herein. Processor circuitry 1604 and 1606 may provide firmware or hardware, and operate software, or any combination thereof, and may have programmable logic or circuitry such as a logic core or cores that may provide a wide array of programmable logic functions. In an implementation, processor(s) may include dedicated hardware such as fixed function circuitry. Fixed function circuitry may include dedicated logic or circuitry and may provide a set of fixed function entry points that may map to the dedicated logic for a fixed purpose or function.

Various components of the systems described herein may be implemented in software, firmware, and/or hardware and/or any combination thereof. For example, various components of the systems or devices discussed herein may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components such as bitstream multiplexer or de-multiplexer modules and the like that have not been depicted in the interest of clarity.

Figure 17:
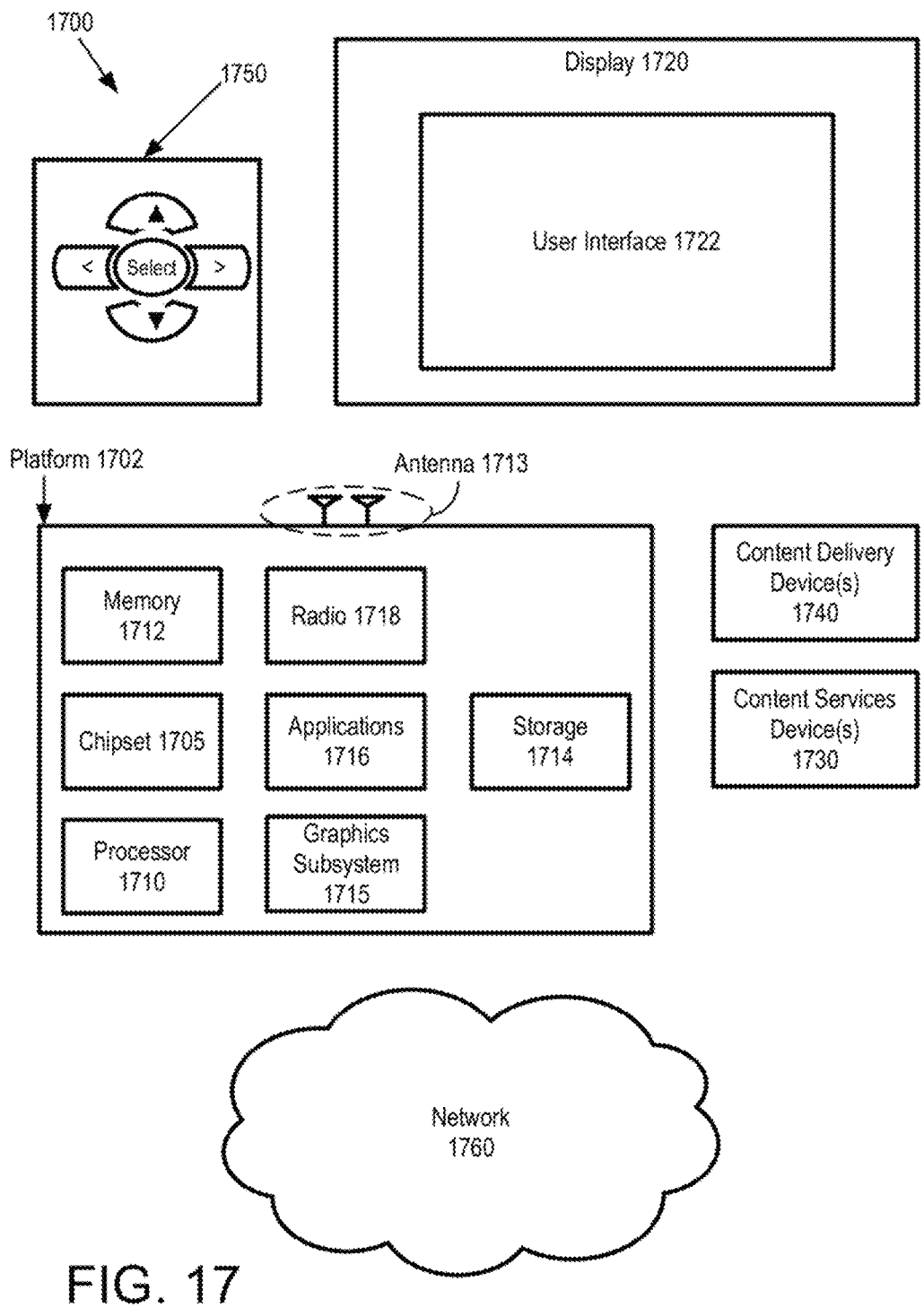
FIG. 17 is an illustrative diagram of another example system.

FIG. 17 is an illustrative diagram of an example system 1700, arranged in accordance with at least some implementations of the present disclosure, and may be any of systems

100, 300, 500, 800, or 1600, or may operate any of processes 200, 250, or 400, described above. In various implementations, system 1700 may be a server, cloud server, internet server, networked computer, or such networked computing device. By other implementations, system 1700 may be a mobile system. For example, system 1700 may be incorporated into a personal computer (PC), laptop computer, ultra-laptop computer, tablet, touch pad, portable computer, hand-held computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras, and so forth.

In various implementations, system 1700 includes a platform 1702 coupled to a display 1720. Platform 1702 may receive content from a content device such as content services device(s) 1730 or content delivery device(s) 1740 or other similar content sources. A navigation controller 1750 including one or more navigation features may be used to interact with, for example, platform 1702 and/or display 1720. Each of these components is described in greater detail below.

In various implementations, platform 1702 may include any combination of a chipset 1705, processor 1710, memory 1712, antenna 1713, storage 1714, graphics subsystem 1715, applications 1716 and/or radio 1718. Chipset 1705 may provide intercommunication among processor 1710, memory 1712, storage 1714, graphics subsystem 1715, applications 1716 and/or radio 1718. For example, chipset 1705 may include a storage adapter (not depicted) capable of providing intercommunication with storage 1714.

Processor 1710 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1710 may be dual-core processor(s), dual-core mobile processor(s), and so forth.

Memory 1712 may be implemented as a volatile memory device such as, but not limited to, a Random Access Memory (RAM), Dynamic Random Access Memory (DRAM), or Static RAM (SRAM).

Storage 1714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1714 may include technology to increase the storage performance enhanced protection for valuable digital media when multiple hard drives are included, for example.

Graphics subsystem 1715 may perform processing of images such as still or video for display. Graphics subsystem 1715 may be a graphics processing unit (GPU) or a visual processing unit (VPU), for example. An analog or digital interface may be used to communicatively couple graphics subsystem 1715 and display 1720. For example, the interface may be any of a High-Definition Multimedia Interface, DisplayPort, wireless HDMI, and/or wireless HD compliant techniques. Graphics subsystem 1715 may be integrated into processor 1710 or chipset 1705. In some implementations, graphics subsystem 1715 may be a stand-alone device communicatively coupled to chipset 1705.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further implementations, the functions may be implemented in a consumer electronics device.

Radio 1718 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1718 may operate in accordance with one or more applicable standards in any version.

In various implementations, display 1720 may include any television type monitor or display. Display 1720 may include, for example, a computer display screen, touch screen display, video monitor, television-like device, and/or a television. Display 1720 may be digital and/or analog. In various implementations, display 1720 may be a holographic display. Also, display 1720 may be a transparent surface that may receive a visual projection. Such projections may convey various forms of information, images, and/or objects. For example, such projections may be a visual overlay for a mobile augmented reality (MAR) application. Under the control of one or more software applications 1716, platform 1702 may display user interface 1722 on display 1720.

In various implementations, content services device(s) 1730 may be hosted by any national, international and/or independent service and thus accessible to platform 1702 via the Internet, for example. Content services device(s) 1730 may be coupled to platform 1702 and/or to display 1720. Platform 1702 and/or content services device(s) 1730 may be coupled to a network 1760 to communicate (e.g., send and/or receive) media information to and from network 1760. Content delivery device(s) 1740 also may be coupled to platform 1702 and/or to display 1720.

In various implementations, content services device(s) 1730 may include a cable television box, personal computer, network, telephone, Internet enabled devices or appliance capable of delivering digital information and/or content, and any other similar device capable of uni-directionally or bi-directionally communicating content between content providers and platform 1702 and/display 1720, via network 1760 or directly. It will be appreciated that the content may be communicated uni-directionally and/or bi-directionally to and from any one of the components in system 1700 and a content provider via network 1760. Examples of content may include any media information including, for example, video, music, medical and gaming information, and so forth.

Content services device(s) 1730 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1702 may receive control signals from navigation controller 1750 having one or more navigation features. The navigation features of may be used to interact with user interface 1722, for example. In various implementations, navigation may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of may be replicated on a display (e.g., display 1720) by movements of a pointer, cursor, focus ring, or other visual indicators displayed on the display. For example, under the control of software applications 1716, the navigation features located on navigation may be mapped to virtual navigation features displayed on user interface 1722, for example. In various implementations, may not be a separate component but may be integrated into platform 1702 and/or display 1720. The present disclosure, however, is not limited to the elements or in the context shown or described herein.

In various implementations, drivers (not shown) may include technology to enable users to instantly turn on and off platform 1702 like a television with the touch of a button after initial boot-up, when enabled, for example. Program logic may allow platform 1702 to stream content to media adaptors or other content services device(s) 1730 or content delivery device(s) 1740 even when the platform is turned "off." In addition, chipset 1705 may include hardware and/or software support for 5.1 surround sound audio and/or high definition 17.1 surround sound audio, for example. Drivers may include a graphics driver for integrated graphics platforms. In various implementations, the graphics driver may include a peripheral component interconnect (PCI) Express graphics card.

In various implementations, any one or more of the components shown in system 1700 may be integrated. For example, platform 1702 and content services device(s) 1730 may be integrated, or platform 1702 and content delivery device(s) 1740 may be integrated, or platform 1702, content services device(s) 1730, and content delivery device(s) 1740 may be integrated, for example. In various implementations, platform 1702 and display 1720 may be an integrated unit. Display 1720 and content service device(s) 1730 may be integrated, or display 1720 and content delivery device(s) 1740 may be integrated, for example. These examples are not meant to limit the present disclosure.

In various implementations, system 1700 may be implemented as a wireless system, a wired system, or a combination of both. When implemented as a wireless system, system 1700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words that are provided for an automated system. For example, control information may be used to route media information through a system, or instruct a node to process the media information in a predetermined manner. The implementations, however, are not limited to the elements or in the context shown or described in FIG. 17.

Figure 18:
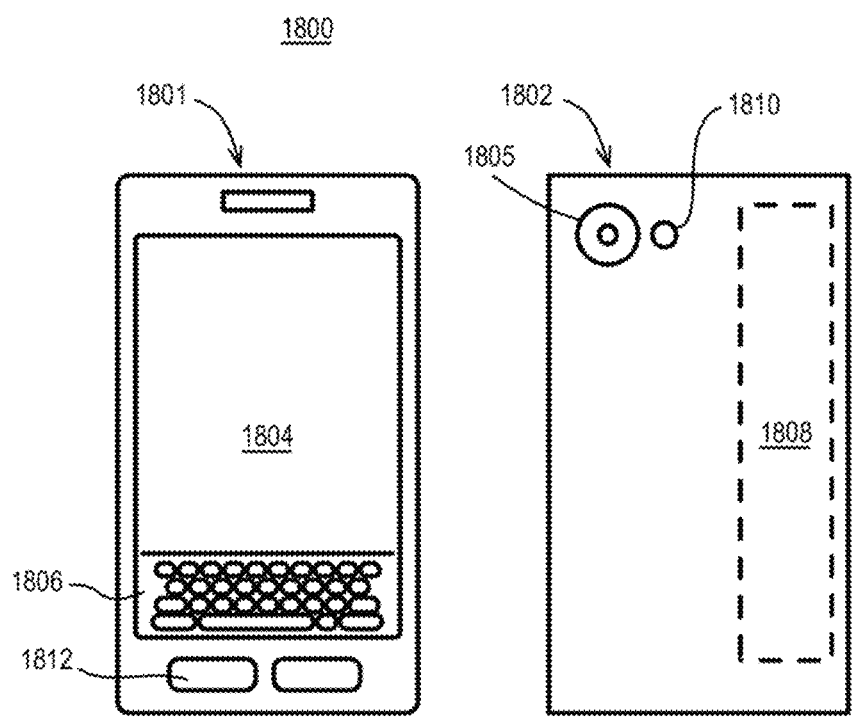
FIG. 18 illustrates an example device, all arranged in accordance with at least some of the implementations of the present disclosure.

As described above, system 1600 or 1700 may be embodied in varying physical styles or form factors. FIG. 18 illustrates an example small form factor device 1800, arranged in accordance with at least some implementations of the present disclosure. In some examples, system 1600 or 1700 may be implemented via device 1800. In other examples, system 100, 300, 500, 800, or portions thereof may be implemented via device 1800. In various implementations, device 1800 may be implemented as a networked computer and/or mobile computing device having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as a wrist computer, finger computers, ring computers, eyeglass computers, belt-clip computers, arm-band computers, shoe computers, clothing computers, and other wearable computers. In various implementations, for example, a mobile computing device may be implemented as a smart phone capable of executing computer applications, as well as voice communications and/or data communications. Although some implementations may be described with a mobile computing device implemented as a smart phone by way of example, it may be appreciated that other implementations may be implemented using other wireless mobile computing devices as well. The implementations are not limited in this context.

As shown in FIG. 18, device 1800 may include a housing with a front 1801 and a back 1802. Device 1800 includes a display 1804, an input/output (I/O) device 1806, and an integrated antenna 1808. Device 1800 also may include navigation features 1812. I/O device 1806 may include any suitable I/O device for entering information into a mobile computing device. Examples for I/O device 1806 may include an alphanumeric keyboard, a numeric keypad, a touch pad, input keys, buttons, switches, microphones, speakers, voice recognition device and software, and so forth. Information also may be entered into device 1800 by way of microphone (not shown), or may be digitized by a voice recognition device. As shown, device 1800 may include one or more cameras 1805 (e.g., including a lens, an aperture, and an imaging sensor) and a flash 1810 integrated into back 1802 (or elsewhere) of device 1800. In other examples, camera 1805 and flash 1810 may be integrated into front 1801 of device 1800 or both front and back cameras may be provided. Camera 1805 and flash 1810 may be components of a camera module to originate image data processed into streaming video that is output to display 1804 and/or communicated remotely from device 1800 via antenna 1808 for example.

Various implementations may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one implementation may be implemented by representative instructions stored on a machine-readable medium which represents various logic within the processor, which when read by a machine causes the machine to fabricate logic to perform the techniques described herein. Such representations, known as IP cores, may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

In one or more first implementations, a device for video coding comprises memory to store at least one video; and at least one processor communicatively coupled to the memory and being arranged to operate by:

The following examples pertain to additional implementations.

By an example one or more first implementations, a computer-implemented method of video coding comprises determining a relationship function between obtained latency and bitstream size feedback associated with transmitted encoded video data; determining one or more outliers of the relationship function; setting a target bitstream size at least partly depending on the outlier; and providing a version of the target bitstream size to be used to set at least one encoder setting to encode a video frame.

By an example second implementation, and further to the first implementation, wherein the relationship function is a linear regression function.

By an example third implementation, and further to the first or second implementation, wherein the determining of the relationship function comprises determining parameters of the function by using averages of the latency feedback and bitstream size feedback associated with a plurality of frames.

By an example fourth implementation, and further to the any one of the first to third implementation, wherein the determining of one or more outliers comprises generating an outlier threshold relative to the relationship function to determine whether or not a feedback pair of the latency feedback and corresponding bitstream size feedback is sufficiently close to being fit to the relationship function.

By an example fifth implementation, and further to the fourth implementation, wherein the feedback pair is a last received feedback pair of a set of the feedback pairs accessible in a memory and used to form separate averages of latency feedback and bitstream size feedback.

By an example sixth implementation, and further to the fourth implementation, wherein the setting comprises adjusting at least one parameter of the relationship function so that the feedback pair fits onto, or is deemed sufficiently near, the relationship function.

By an example seventh implementation, and further to any one of the first to sixth implementation, wherein the method comprises determining the target bitstream size depending on a latency threshold and parameters of the relationship function.

By an example eighth implementation, and further to any one of the first to seventh implementation, wherein the method comprises refining an initial target bitstream size by using reinforcement learning wherein rewards are associated with the feedback.

By an example ninth implementation, and further to the eighth implementation, wherein the rewards are generated by using a ratio of latency feedback to latency threshold.

In one or more example tenth implementations, at least one non-transitory article with at least one machine readable medium comprising a plurality of instructions that, in response to being executed on a computing device, cause the computing device to operate by: obtaining latency and bitstream size feedback associated with transmitted encoded video frames; generating an initial target bitstream size using the feedback; generating an output target bitstream size by adjusting the initial target bitstream size using reinforcement learning; and providing the output target bitstream size to set an encoder setting to encode a video frame.

By an example eleventh implementation, and further to the tenth implementation, wherein reinforcement learning states are generated by using the feedback and the initial target bitstream sizes.

By an example twelfth implementation, and further to the eleventh implementation, wherein the states comprise trends over multiple frames comprising a bitstream size feedback trend, a latency feedback trend, and an initial target bitstream size trend.

By an example thirteenth implementation, and further to any one of the tenth to twelfth implementation, wherein an actor policy of the reinforcement learning comprises using double Q-learning tables that are populated with table values sorted by available state and available action value for each state.

By an example fourteenth implementation, and further to the thirteenth implementation, wherein the table values are computed by using a reward and an expected feedback pair of bitstream size feedback and latency feedback.

By an example fifteenth implementation, and further to the fourteenth implementation, wherein the instructions are arranged to cause the computing device to generate an output target bitstream size comprising modifying an initial target bitstream size by using the actor.

By an example sixteenth implementation, and further to any one of the tenth to fifteenth implementation, wherein the reinforcement learning comprises using an actor policy that generates an action that is one of available multiple actions each associated with a different frame to frame speed of change of bitstream size.

By an example seventeenth implementation, and further to any one of the thirteenth to sixteenth implementation, wherein an action generated by the reinforcement learning is a filter coefficient applied to the initial target bitstream size.

By an example eighteenth implementation, and further to any one of the tenth to seventeenth implementation, wherein the generating of an initial target bitstream size comprises determining a relationship function and outliers relative to the relationship function that indicate an abrupt change to status of a network transmitting the encoded video frames; and using the outliers to modify the relationship function.

By one or more example nineteenth implementations, a computer-implemented system comprises: memory to store data of latency feedback and bitstream size feedback associated with transmitted encoded video frames; and processor circuitry forming at least one processor communicatively coupled to the memory and being arranged to operate by: determining one or more outliers of a relationship function between the latency and bitstream size feedback; setting an initial target bitstream size at least partly depending on the outlier; generating an output target bitstream size by adjusting the initial target bitstream size using reinforcement learning; and providing the output target bitstream size to adjust at least one encoder setting to encode a video frame.

By an example twentieth implementation, and further to the nineteenth implementation, wherein the reinforcement learning comprises updating two double Q-learning tables comprising selecting one of the two tables randomly to update.

By an example twenty-first implementation, and further to the nineteenth or twentieth implementation, wherein the reinforcement learning comprises updating two double Q-learning tables wherein the updating of one table at a value position on one table comprises using the value at a corresponding location on another one of the tables.

By an example twenty-second implementation, and further to any one of the nineteenth to twenty-first implementation, wherein the reinforcement learning comprises determining an action by looking up a state on one Q-learning table and selecting one of multiple available table values of the state based on a criterium and where each table value of the state indicates use of a different action value.

By an example twenty-third implementation, and further to any one of the nineteenth to twenty-first implementation, wherein the reinforcement learning comprises determining an action by looking up a state on two or more Q-learning tables, summing corresponding positions of multiple values of the state from each table, and selecting the action depending on the sum that meets a criterium, wherein each sum is associated with a different action value.

By an example twenty-fourth implementation, and further to any one of the nineteenth to twenty-third implementation, wherein the reinforcement learning comprises determining an action by looking up a state on one Q-learning table and selecting one of multiple available table values of the state randomly and where each table value of the state indicates a different action value.

By an example twenty-fifth implementation, and further to any one of the nineteenth to twenty-fourth implementation, wherein the setting comprises revising one or more parameters of the relationship function so that a modified relationship function fits feedback forming an outlier, and determining the initial target bitstream size depending on an intersection of the modified relationship function and a latency threshold.

In one or more twenty-sixth implementations, a device, apparatus, or system includes means to perform a method according to any one of the above implementations.

In one or more twenty-seventh implementations, at least one machine readable medium includes a plurality of instructions that in response to being executed on a computing device, cause the computing device to perform a method according to any one of the above implementations.

It will be recognized that the implementations are not limited to the implementations so described, but can be practiced with modification and alteration without departing from the scope of the appended claims. For example, the above implementations may include specific combination of features. However, the above implementations are not limited in this regard and, in various implementations, the above implementations may include the undertaking only a subset of such features, undertaking a different order of such features, undertaking a different combination of such features, and/or undertaking additional features than those features explicitly listed. The scope of the implementations should, therefore, be determined with reference to the appended claims, along with the full scope of equivalents to which such claims are entitled.

What is claimed is:

1. A computer-implemented method of video coding comprising:
   determining a relationship function relating latency and bitstream size associated with transmitted encoded video data based on one or more feedback pairs of the latency and the bitstream size, the relationship function having a slope parameter and an intercept parameter;
   determining one or more outliers of the relationship function;
   determining an updated relationship function relating the latency and the bitstream size by updating the intercept parameter based on the one or more outliers;
   looking up a target bitstream size that corresponds to a predetermined latency value using the updated relationship function;
   providing the target bitstream size to an output filter to determine a version of the target bitstream size, the output filter having a parameter which is determined using reinforcement learning; and
   providing the version of the target bitstream size to be used to set at least one encoder setting to encode a video frame.

2. The computer-implemented method of claim 1, wherein the relationship function and the updated relationship function are linear regression functions.

3. The computer-implemented method of claim 1, wherein determining of the relationship function comprises determining the slope parameter and the intercept parameter of the relationship function by using averages of the one or more feedback pairs associated with one or more frames.

4. The computer-implemented method of claim 1, wherein determining of the one or more outliers comprises generating an outlier threshold relative to the relationship function, and determining whether a mean squared error of a latest feedback pair of the one or more feedback pairs meets the outlier threshold.

5. The computer-implemented method of claim 4, wherein the one or more feedback pairs are accessible in a memory and are used to form separate averages of latency feedback and bitstream size feedback.

6. The computer-implemented method of claim 4, wherein determining the updated relationship function comprises adjusting the intercept parameter of the relationship function so that the latest feedback pair fits onto, or is deemed sufficiently near, the relationship function.

7. The computer-implemented method of claim 1, wherein determining the updated relationship function comprises keeping the slope parameter the same or unchanged.

8. The computer-implemented method of claim 1, wherein the parameter of the output filter are determined based on rewards, and the rewards are calculated based on the one or more feedback pairs of latency and bitstream size.

9. The computer-implemented method of claim 8, wherein a rewards for a given feedback pair having a given latency and a given bitstream size is calculated by multiplying a weight and the given bitstream size, and the weight is determined based on a ratio of the given latency and the predetermined latency value.

10. At least one non-transitory machine readable medium comprising a plurality of instructions that, in response to being executed on a computing device, cause the computing device to operate by:
obtaining one or more feedback pairs of latency and bitstream size associated with transmitted encoded video frames;
determining a slope parameter and an intercept parameter of a linear relationship function relating latency and bitstream size based on the one or more feedback pairs;
determining an adjusted intercept parameter of an updated linear relationship function relating the latency and the bitstream size based on one or more outliers of the linear relationship function;
looking up an initial target bitstream size corresponding to a latency threshold using the updated linear relationship function having the adjusted intercept parameter;
generating an output target bitstream size by inputting the initial target bitstream size into an output filter, wherein a coefficient of the output filter is determined using reinforcement learning; and
providing the output target bitstream size to set an encoder setting to encode a video frame.

11. The at least one non-transitory machine readable medium of claim 10, wherein reinforcement learning states are generated by using the one or more feedback pairs and the initial target bitstream size.

12. The at least one non-transitory machine readable medium of claim 11, wherein a reinforcement learning state in the reinforcement learning states comprises trends over multiple frames, and the trends comprise a bitstream size feedback trend, a latency feedback trend, and an initial target bitstream size trend.

13. The at least one non-transitory machine readable medium of claim 10, wherein an actor of the reinforcement learning comprises double Q-learning tables that are populated with table values sorted by available state and available action value for each state.

14. The at least one non-transitory machine readable medium of claim 13, wherein the table values are computed by using a reward and an expected feedback pair of the bitstream size and the latency.

15. The at least one non-transitory machine readable medium of claim 14, wherein the actor determines the coefficient of the output filter.

16. The at least one non-transitory machine readable medium of claim 10, wherein the reinforcement learning comprises using an actor that generates an action that is one of available multiple actions each associated with a different frame to frame speed of change of the bitstream size.

17. The at least one non-transitory machine readable medium of claim 10, wherein the output filter is an infinite impulse response filter, and the coefficient of the output filter determines a speed at which the output filter refines the initial target bitstream size from frame to frame.

18. The at least one non-transitory machine readable medium of claim 10, wherein the one or more outliers of the linear relationship function indicate an abrupt change to a status of a network transmitting the transmitted encoded video frames.

19. A computer-implemented system comprising:
memory to store feedback data points of latency and bitstream size associated with transmitted encoded video frames; and
processor circuitry forming at least one processor communicatively coupled to the memory and being arranged to operate by:
determining a slope parameter and an intercept parameter of a relationship function relating latency and bitstream size based on the feedback data points;
determining one or more outliers of the relationship function;
determining an adjusted relationship function by updating the intercept parameter based on the one or more outliers;
looking up an initial target bitstream size corresponding to a latency value using the adjusted relationship function;
generating an output target bitstream size by adjusting the initial target bitstream size using an infinite impulse response filter, wherein a filter coefficient of the infinite impulse response filter controls a speed of target bitstream size change from frame to frame, and the filter coefficient is determined using reinforcement learning and rewards calculated based on the feedback data points; and
providing the output target bitstream size to adjust at least one encoder setting to encode a video frame.

20. The computer-implemented system of claim 19, wherein the reinforcement learning comprises choosing the filter coefficient randomly.

* * * * *